United States Patent
Van der Auwera et al.

(10) Patent No.: US 11,303,885 B2
(45) Date of Patent: Apr. 12, 2022

(54) WIDE-ANGLE INTRA PREDICTION SMOOTHING AND INTERPOLATION

(71) Applicant: QUALCOMM Incorporated, San Diego, CA (US)

(72) Inventors: Geert Van der Auwera, Del Mar, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/663,193

(22) Filed: Oct. 24, 2019

(65) Prior Publication Data

US 2020/0137381 A1     Apr. 30, 2020

Related U.S. Application Data

(60) Provisional application No. 62/750,749, filed on Oct. 25, 2018, provisional application No. 62/865,872, filed on Jun. 24, 2019.

(51) Int. Cl.
*H04N 19/105*      (2014.01)
*H04N 19/117*      (2014.01)
(Continued)

(52) U.S. Cl.
CPC ......... *H04N 19/105* (2014.11); *H04N 19/117* (2014.11); *H04N 19/159* (2014.11); *H04N 19/172* (2014.11); *H04N 19/176* (2014.11)

(58) Field of Classification Search
None
See application file for complete search history.

(56) References Cited

U.S. PATENT DOCUMENTS 8,750,378 B2   6/2014  Karczewicz et al.
9,008,175 B2*  4/2015  Van Der Auwera ........................
                                                                   H04N 19/147
                                                                   375/240.12
(Continued)

FOREIGN PATENT DOCUMENTS

CN        102668569 A     9/2012
CN        102857750 A     1/2013
(Continued)

OTHER PUBLICATIONS

Anonymous: "Preview Document JVET-L1001 for Macao Meeting," Oct. 31, 2018 (Oct. 31, 2018), XP055657004, Retrieved from the Internet: URL: http://phenix.int-evry.fr/jvet/ [retrieved on Jan. 10, 2020].

(Continued)

*Primary Examiner* — Patricia I Young
(74) *Attorney, Agent, or Firm* — Shumaker & Sieffert, P.A.

(57) ABSTRACT

A device for decoding video data can be configured to determine a size for a block of video data, wherein the block of video data comprises a rectangular, non-square block; determine an intra prediction mode for the block of video data; locate, in a neighboring block of the block of video data, reference samples corresponding to the determined intra prediction mode; in response to the intra prediction mode for the block of video data being a wide-angle intra prediction mode and corresponding to a diagonal direction of the block, filter the reference samples to determine filtered reference samples; generate a predictive block for the block of video data from the filtered reference samples; determine decoded version of the block of video data from the predictive block; and output the decoded version of the block of video data.

42 Claims, 13 Drawing Sheets

(51) Int. Cl.
H04N 19/159 (2014.01)
H04N 19/172 (2014.01)
H04N 19/176 (2014.01)

(56) References Cited

U.S. PATENT DOCUMENTS

| | | | |
|---|---|---|---|
| 9,654,785 B2 | 5/2017 | Chien et al. | |
| 10,070,126 B2 | 9/2018 | Guo et al. | |
| 10,142,627 B2 | 11/2018 | Zhao et al. | |
| 10,841,593 B2 | 11/2020 | Zhao et al. | |
| 2012/0082224 A1* | 4/2012 | Van Der Auwera | H04N 19/85 375/240.12 |
| 2012/0106640 A1 | 5/2012 | Shen et al. | |
| 2012/0183041 A1 | 7/2012 | Maani et al. | |
| 2013/0022115 A1 | 1/2013 | Oh et al. | |
| 2013/0034153 A1 | 2/2013 | Song et al. | |
| 2013/0094581 A1 | 4/2013 | Tanizawa et al. | |
| 2013/0107949 A1 | 5/2013 | Sim et al. | |
| 2013/0114707 A1 | 5/2013 | Seregin et al. | |
| 2013/0259117 A1 | 10/2013 | Fu et al. | |
| 2013/0266064 A1 | 10/2013 | Zhang et al. | |
| 2013/0267261 A1 | 10/2013 | Nikkelen | |
| 2013/0272380 A1 | 10/2013 | Chien et al. | |
| 2014/0079122 A1 | 3/2014 | Kondow | |
| 2014/0086323 A1 | 3/2014 | Chuang et al. | |
| 2014/0133565 A1 | 5/2014 | Lee et al. | |
| 2014/0219334 A1 | 8/2014 | Park | |
| 2015/0023405 A1 | 1/2015 | Joshi et al. | |
| 2015/0071352 A1 | 3/2015 | Kim et al. | |
| 2015/0078438 A1 | 3/2015 | Lim et al. | |
| 2015/0098505 A1 | 4/2015 | Oh et al. | |
| 2016/0373742 A1 | 12/2016 | Zhao et al. | |
| 2016/0373743 A1 | 12/2016 | Zhao et al. | |
| 2016/0373769 A1 | 12/2016 | Zhao et al. | |
| 2016/0373770 A1 | 12/2016 | Zhao et al. | |
| 2016/0373782 A1 | 12/2016 | Zhao et al. | |
| 2017/0223379 A1* | 8/2017 | Chuang | H04N 19/593 |
| 2017/0244867 A1 | 8/2017 | Yasutomi | |
| 2017/0251224 A1 | 8/2017 | Lee et al. | |
| 2017/0353730 A1* | 12/2017 | Liu | H04N 19/105 |
| 2018/0255304 A1 | 9/2018 | Jeon et al. | |
| 2020/0007895 A1 | 1/2020 | Van Der Auwera et al. | |
| 2020/0275096 A1 | 8/2020 | Rath et al. | |

FOREIGN PATENT DOCUMENTS

| | | |
|---|---|---|
| CN | 102918844 A | 2/2013 |
| CN | 103248892 A | 8/2013 |
| CN | 103262625 A | 8/2013 |
| CN | 103283222 A | 9/2013 |
| CN | 103636203 A | 3/2014 |
| CN | 103636220 A | 3/2014 |
| CN | 104170379 A | 11/2014 |
| CN | 104320666 A | 1/2015 |
| CN | 104378645 A | 2/2015 |
| CN | 104702962 A | 6/2015 |
| EP | 2773118 A1 | 9/2014 |
| JP | 2006081156 A | 3/2006 |
| JP | 2013058939 A | 3/2013 |
| JP | 2013090120 A | 5/2013 |
| JP | 2014501090 A | 1/2014 |
| JP | 2014520476 A | 8/2014 |
| JP | 2014523187 A | 9/2014 |
| JP | 2014523697 A | 9/2014 |
| JP | 2014528670 A | 10/2014 |
| JP | 2014530556 A | 11/2014 |
| KR | 20140129423 A | 11/2014 |
| KR | 20150034699 A | 4/2015 |
| WO | 2009004985 A1 | 1/2009 |
| WO | WO-2010039492 A2 | 4/2010 |
| WO | WO-2012044886 A1 | 4/2012 |
| WO | WO-2012170812 A1 | 12/2012 |
| WO | WO-2012173315 A1 | 12/2012 |
| WO | WO-2013000324 A1 | 1/2013 |
| WO | 2013051903 A1 | 4/2013 |
| WO | WO-2013067334 A2 | 5/2013 |
| WO | WO-2013105622 A1 | 7/2013 |
| WO | WO-2013154939 A1 | 10/2013 |
| WO | WO-2015000168 A1 | 1/2015 |
| WO | WO-2017084628 A1 | 5/2017 |
| WO | WO-2018063886 A1 | 4/2018 |

OTHER PUBLICATIONS

Bossen F., et al., "JVET Common Test Conditions and Software Reference Configurations for SDR video," 11th Meeting; Ljubljana, SI, Jul. 10-18, 2018, Joint Collaborative Team on Video Coding (JCT-VC) of ITU-T SG 16 WP 3 and ISO/IEC JTC 1/SC 29/WG 1, No. JVET-K1010_v2, 6 pp.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "Versatile Video Coding (Draft 2)", 11. JVET Meeting; Jul. 11-Jul. 18, 2018; Ljubljana; (The Joint Video Exploration Team of ISO/IEC JTC1/SC29/WG11 and ITU-T SG.16), No. JVET-K1001, Sep. 21, 2018 (Sep. 21, 2018), XP030193577, 135 Pages, Retrieved from the Internet: URL: http://phenix.int-evry.fr/jvet/doc_end_user/documents/11_Ljubljana/wg11/JVET-K1001-v6.zip JVET-K1001-v6.docx [retrieved on Sep. 21, 2018] pp. 56-68, paragraph 8.2.4.2—paragraph 8.2.4.2.9; figures 8-1, tables 8-5.

Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.

Chen, et al., "Further improvements to HMKTA-1.0," ITU-Telecommunications Standardization Sector, Jun. 19-26, 2015, No. VCEG-AZ07_v2, 9 pp.

Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.

Chen J, et al., "Algorithm Description for Versatile Video Coding and Test Model 2 (VTM 2)", 11. JVET Meeting, Jul. 11-Jul. 18, 2018, Ljubljana, (The Joint Video Exploration Team of ISO/IEC JTC1/SC29/WG11 and ITU-TSG.16), No. JVET-K1002-v1, Aug. 10, 2018 (Aug. 10, 2018), XP030193537, 19 Pages, Retrieved from the Internet: URL: http://phenix.int-evry.fr/jvet/doc_end_user/documents/11_Ljubljana/wg11/JVET-K1002-v1.zip JVET-K1002-v1.docx, [retrieved on Aug. 10, 2018], Sections 1-3, figure 1.

Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, Doc: JVET-L1002, 48 pages.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.

Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.

JVET: "VTM-5.0, Tags, JVET/VVCSoftware_VTM, GitLab", Frank Bossen, https://vcgit.hhi.fraunhofer.de/jvet/VVCSoftware_VTM/-/tags/VTM-5.0, pp. 1-3.

Chuang T-D., et al., "CE6b: Intra Prediction Mode Coding", 7. JCT-VC Meeting; 98. MPEG Meeting; Nov. 21-Nov. 30, 2011, Geneva, (Joint Collaborative Team on Video Coding of ISO/IEC

(56) References Cited

OTHER PUBLICATIONS

JTC1/SC29/WG11 and ITU-T SG.16), URL: http://wftp3.itu.int/av-arch/jctvc-site/, No. JCTVC-G203, Nov. 7, 2011 (Nov. 7, 2011), XP030110187, pp. 1-6.
Cohen R., et al., "Non-CE6: Coding of luma intra prediction modes that are not in the MPM set," 98 MPEG Meeting, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G359_r2, WG11 No. m21921, 13 pages.
Ergen S., "ZigBee/IEEE 802.15.4 Summary", Sep. 10, 2004, 37 Pages.
Fei L., et al., "A Light-weight HEVC Encoder for Image Coding," 2013 Visual Communications and Image Processing (VCIP), IEEE, Nov. 17, 2013 (Nov. 17, 2013), pp. 1-5, XP032543699, DOI: 10.1109/VCIP.2013.6706448.
Filippov A., et al., "CE3: A Combination of Tests 3.1.2 and 3.1.4 for Intra Reference Sample Interpolation Filter", Joint Video Experts Team (JVET) of ITU-T SG 16 WP 3 and ISO/IEC JTC 1/SC 29/WG 11, JVET-L0628-V2, Oct. 2018, 5 pages.
Guo M., et al., "Improved Intra Mode Coding", Joint Collaborative Team on Video Coding (JCT-VC) of ITU-T SG16 WP3 and ISO/IEC JTC1/SC29/WG11, 4th Meeting: Daegu, Korea, Jan. 2011, JCTVC-D166, pp. 1-7.
H.264 Prediction ; "Chapter 6" In:Iain E. Richardson: "The H.264 Advanced Video Compression Standard, 2nd Edition",Apr. 20, 2010 (Apr. 20, 2010), Wiley,XP030001637,ISBN: 978-0-470-51692-8 pp. 137-177.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/058111—ISA/EPO—dated Mar. 18, 2020.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
ITU-T H.265, "Series H: Audiovisual and Multimedia Systems, Infrastructure of audiovisual services—Coding of moving video, High efficiency video coding," The International Telecommunication Union. Dec. 2016, 664 Pages.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
Iwamura S., et al., "Description of SDR and HDR video coding technology proposal by NHK and Sharp", 10. JVET Meeting; Apr. 10-Apr. 20, 2018; San Diego; (The Joint Video Exploration Team of ISO/IEC JTC1/SC29/WG11 and ITU-T SG.16 ); URL:http://phenix.int-evry.fr/jvet/ ,No. JVET-J0027, Apr. 2, 2018 (Apr. 2, 2018), XP030151195, 40 Pages, Section 2.1.8 Intra Prediction.
Kim D-Y., et al., "A New Method for Estimating Intra Prediction Mode in H.264/AVC", IEICE Trans. Fundamentals of Electronic Communication and Computer Science, vol. E91-A, No. 6, Jun. 2008, pp. 1529-1532 (Year: 2008).
Koo M., et al., "Description of SDR video coding technology proposal by LG Electronics", 10. JVET Meeting; Apr. 4-Apr. 20, 2018; San Diego; (The Joint Video Exploration Team of ISO/IEC JTC1/SC29/G11 and ITU-T SG.16 ); URL:http://phenix.int-evry.fr/jvet/ , No. JVET-J0017, Apr. 3, 2018 (Apr. 3, 2018), XP030151177, 70 Pages, Section 2.1.8 Intra prediction.
Lainema J., et al., Chapter 4 Intra-Picture Prediction in HEVC, In: "High Efficiency Video Coding (HEVC)", vol. 29, pp. 91-112, Aug. 1, 2014 (Aug. 1, 2014), Springer International Publishing, XP055292569, ISBN: 978-3-319-06894-7.

Lainema J., et al., "Intra Coding of the HEVC Standard", IEEE Transactions on Circuits and Systems for Video Technology, Institute of Electrical and Electronics Engineers, USA, vol. 22, No. 12, Dec. 1, 2012 (Dec. 1, 2012), XP011487148, pp. 1792-1801.
Lee S-H., et al., "Fast Intra Prediction Mode Decision based on Rough Mode Decision and Most Probable Mode in HEVC", JBE vol. 19, No. 2, Mar. 2014, 8 pages.
Lehmann T.M., et al., "Survey: Interpolation Methods in Medical Image Processing", IEEE Transactions on Medical Imaging, IEEE Service Center, Piscataway, NJ, US, vol. 18, No. 11, Nov. 1, 1999 (Nov. 1, 1999), pp. 1049-1075, XP011035921, ISSN: 0278-0062.
Lin P., et al., "Non-CE3: Harmonization Between WAIP and Intra Smoothing Filters," 126. MPEG Meeting, Mar. 25-Mar. 29, 2019, Geneva, (Motion Picture Expert Group or ISO/IEC JTC1/SC29/WG11), No. m47097, Mar. 22, 2019 (Mar. 22, 2019), XP030210668, 3 pages, Retrieved from the Internet: URL: http://phenix.int-evry.fr/mpeg/doc_end_user/documents/126_Geneva/wg11/m47097-JVET-N4035-v3-JVET-N0435-v3.zip JVET-N0435-v2.docx [retrieved on Mar. 22, 2019] the whole document.
Matsuo S., et al., "Improved Intra Angular Prediction by DCT-Based Interpolation Filter", IEEE Proceedings of the 20th European Signal Processing Conference (EUSIPCO), Aug. 27, 2012 (Aug. 27, 2012), pp. 1568-1572, XP032254770, ISBN: 978-1-4673-1068-0.
Matsuo Y., et al., "Video Coding of 8K UHDTV by HEVC/H.265 With Spatio-Gradational Reduction and Its Restoration", Picture Coding Symposium (PCS), May 31-Jun. 3, 2015, pp. 40-44, ISBN: 978-1-4799-7783-3.
Partial International Search Report—PCT/US2019/058111—ISA/EPO—Jan. 23, 2020.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.
Sze V., et al., "High Efficiency Video Coding (HEVC): Algorithms and Architectures", Springer international Publishing Switzerland, pp. 91-112, ISSN 1558-9412, Springer-2014.
Van Der Auwera G., et al., "Description of Core Experiment 3: Intra Prediction and Mode Coding", Joint Video Experts Team (JVET) of ITU-T SG 16 WP 3 and ISO/IEC JTC 1/SC 29/WG 11, Jul. 10-18, 2018, JVET-K1023-v1, 32 pages.
Van Der Auwera (Qualcomm) G., et al., "CE3: Intra Reference Sample Interpolation Filter Selection Using MDIS Conditions (Test 3.1.2)", 124. MPEG Meeting; Oct. 8-Oct. 12, 2018; MACAO; (Motion Picture Expert Group or ISO/IEC JTC1/SC29/WG11) No. m44348, Oct. 2, 2018 (Oct. 2, 2018), XP030191689, pp. 1-14, Retrieved from the Internet: URL: http://phenix.int-evry.fr/mpeg/doc_end_user/documents/124_Macao/wg11/m44348-JVET-L0324-v2-JVET-L0324-v2.zipJVET-L0324_v2.docx [retrieved-on Oct. 2, 2018] the whole document.
Van Der Auwera (Qualcomm) G., et al., "CE3-related: On MDIS and intra interpolation filter switching", 11. JVET Meeting; Jul. 10-Jul. 18, 2018; Ljubljana; (The Joint Video Exploration Team of ISO/IEC JTC1/SC29/WG11 and ITU-T SG.16), No. JVET-K0064, Jul. 13, 2018 (Jul. 13, 2018), XP030199604, 7 Pages, Retrieved from the Internet: URL:http://phenix.int-evry.fr/jvet/doc_end_user/documents/11_Ljubljana/wg11/JVET-K0064-v2.zip JVET-K0064_v2.docx [retrieved on Jul. 13, 2018] Section 2 Proposal.
Vatis Y., et al., "Two-Dimensional Non-Separable Adaptive Wiener Interpolation Filter for H.264/AVC", 72, MPEG Meeting, Apr. 18-Apr. 22, 2005, Susan, (Motion Picture Expert Group or ISO/IEC JTC1/SC29/WG11), No. M11845, Apr. 29, 2005 (Apr. 29, 2005),6 Pages, XP030040567, ISSN: 0000-0249.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.
Yeo et al., "Non-CE6: on Intra Prediction Mode Coding," JTC1/SC29/WG11, 7th Meeting, JCTVC-G153, m21706, Nov. 21-30, 2011, 12 pages, XP030110137.

(56) References Cited

OTHER PUBLICATIONS

Yinhe Z., et al., "A MPM based Fast Mode Decision Algorithm for Intra Prediction in HEVC", Oct. 31, 2013, pp. 1-7.
Zhao L., et al., "Fast Mode Decision Algorithm for Intra Prediction in HEVC", Visual Communications and Image Processing (VCIP), 2011, IEEE, Nov. 6, 2011 (Nov. 6, 2011), pp. 1-4, XP032081373, DOI: 10.11 09/VCIP.2011.6115979, ISBN:978-1-4577-1321-7, Abstract Section I. "Introduction" section III.A "Motivating Observations" section III.B "Implementation of Proposed Fast Intra Mode Decision".
Zhao L., et al., "CE3-related: Unification of Angular Intra Prediction for Square and Non-square Blocks," 12, JVET Meeting, Oct. 3-Oct. 12, 2018, Macao, (The Joint Video Exploration Team of ISO/IEC JTC1/SC29/WG11 and ITU-T SG.16), No. JVET-L0279, Oct. 6, 2018 (Oct. 6, 2018), XP030195082, pp. 1-10, Retrieved from the Internet: URL:http://phenix.int-evry.fr/jvet/doc_end_user/documents/12_Macao/wg11/JVET-L0279-v3.zip JVET-L0279-v1.docx [retrieved on Oct. 6, 2018] cited in the application the whole document.
Zhu S., et al.,"Fast Intra-Prediction Mode Decision Algorithm for High Efficieny Video Coding", 2014 9th IEEE Conference on Industrial Electronics and Applications, IEEE, Jun. 9, 2014 (Jun. 9, 2014), pp. 936-939, XP032665890, DOI: 10.1109/ICIEA.2014.6931297.
Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-V8, 400 pp.
Auwera G., et al., "Non-CE3: Intra Simplifications", Joint Video Experts Team (JVET) of ITU-T SG 16 WP 3 and ISO/IEC14 UTC 1/5C 29/WG 11, 13th Meeting: Marrakech, MA, Jan. 9-18, 2019, JVET-M0095, pp. 1-5.
Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010, pp. 1-6.
Tsai et al., "CE3-related: Simplification and unification for intra reference sample filtering", Joint Video Experts Team (JVET) of ITU-T SG 16 WP 3 and ISO/IEC JTC1/SC29/WG11, 15th Meeting: Gothenburg, SE, Jul. 3-12, 2019, JVET-O0277-v3, 5 pp.
International Preliminary Report on Patentability—PCT/US2019/058111, The International Bureau of WIPO—Geneva, Switzerland, May 6, 2021 14 Pages.
Chien W-J., et al., "Parsing friendly intra mode coding", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F459_r2, pp. 1-5.
Chuang T-D., et al.,"Luma Intra Prediction Mode Coding", 6. JCT-VC Meeting; 97. Mpeg Meeting; Jul. 14-Jul. 22, 2011; Torino; (Joint Collaborative Team on Video Coding of ISO/ IEC JTC1/SC29/WG11 and ITU-T SG. 16 ) ; URL: http://wftp3.itu.int/av-arch/jctvc-site/,, No. JCTVC-F062-r1, Jul. 15, 2011 (Jul. 15, 2011), 5 pages, XP030009085.
Francois E., et al., "CE6b: Intra mode coding with 4 MPMs and mode ranking", Joint Collaborative Team on Video Coding (JCT-VC) of ITU-T SG16 WP3 and ISO/IEC JTC1/SC29/WG11, 7th Meeting, Geneva, CH, Nov. 21-30, 2011, Document: JCTVC-G243, XP030110227, 8 pages.
"High Efficiency Video Coding, Recommendation ITU-T H.265", Series H: Audiovisual and Multimedia Systems, Infrastructure of Audiovisual Services—Coding of Moving Video, ITU-T, Telecommunication Standardization Sector of ITU, Oct. 2014, H.265, (Oct. 2014), pp. 117-119, 125-128.
Kumakura T., et al., "Intra Prediction Mode Coding based on Direction Difference," Joint Collaborative Team on Video Coding (JCT-VC) of ITU-T SG16 WP3 and ISO/IEC JTC1/SC29/WG11,6th Meeting: Torino, IT,Jul. 2011, JCTVC-F339, pp. 1-13.
Sze V., et al., "High Efficiency Video Coding (HEVC), Integrated Circuit and Systems, Algorithms and Architectures". vol. 39, Springer, 2014, pp. 49-90, [Jan. 8, 2014].

\* cited by examiner

WIDE-ANGLE INTRA PREDICTION SMOOTHING AND INTERPOLATION

This application claims the benefit of:
U.S. Provisional Patent Application 62/750,749, filed Oct. 25, 2018; and
U.S. Provisional Patent Application 62/865,872, filed Jun. 24, 2019, the entire content of both being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for encoding and decoding video data. In particular, this disclosure describes example techniques for encoding and decoding video data using wide-angle intra prediction. The techniques of this disclosure potentially improve video coding quality by configuring video encoder and decoders to perform filtering, e.g., intra smoothing filtering, in more coding scenarios where such filtering is advantageous.

According to one example, a method of decoding video data includes determining a size for a block of video data, wherein the block of video data comprises a rectangular, non-square block; determining an intra prediction mode for the block of video data; locating, in a neighboring block of the block of video data, reference samples corresponding to the determined intra prediction mode; in response to the intra prediction mode for the block of video data being a wide-angle intra prediction mode and corresponding to a diagonal direction of the block, filtering the reference samples to determine filtered reference samples; generating a predictive block for the block of video data from the filtered reference samples; determining decoded version of the block of video data from the predictive block; and outputting the decoded version of the block of video data.

According to another example, a device for decoding video data includes a memory for storing video data; and one or more processors configured to determine a size for a block of the video data, wherein the block of the video data comprises a rectangular, non-square block; determine an intra prediction mode for the block of the video data; locate, in a neighboring block of the block of the video data, reference samples corresponding to the determined intra prediction mode; in response to the intra prediction mode for the block of the video data being a wide-angle intra prediction mode and corresponding to a diagonal direction of the block, filter the reference samples to determine filtered reference samples; generate a predictive block for the block of the video data from the filtered reference samples; determine decoded version of the block of the video data from the predictive block; and output the decoded version of the block of the video data.

A computer-readable storage medium storing instructions that when executed by one or more processors cause the one or more processor to determine a size for a block of the video data, wherein the block of the video data comprises a rectangular, non-square block; determine an intra prediction mode for the block of the video data; locate, in a neighboring block of the block of the video data, reference samples corresponding to the determined intra prediction mode; in response to the intra prediction mode for the block of the video data being a wide-angle intra prediction mode and corresponding to a diagonal direction of the block, filter the reference samples to determine filtered reference samples; generate a predictive block for the block of the video data from the filtered reference samples; determine decoded version of the block of the video data from the predictive block; and output the decoded version of the block of the video data.

According to another example, an apparatus for decoding video data includes means for determining a size for a block of video data, wherein the block of video data comprises a rectangular, non-square block; means for determining an intra prediction mode for the block of video data; means for locating, in a neighboring block of the block of video data, reference samples corresponding to the determined intra prediction mode; means for filtering the reference samples to determine filtered reference samples in response to the intra prediction mode for the block of video data being a wide-angle intra prediction mode and corresponding to a diagonal direction of the block; means for generating a predictive block for the block of video data from the filtered reference samples; means for determining decoded version of the block of video data from the predictive block; and means for outputting the decoded version of the block of video data.

The details of one or more examples are set forth in the accompanying drawings and the description below. Other features, objects, and advantages will be apparent from the description, drawings, and claims.

DETAILED DESCRIPTION

Figure 1:
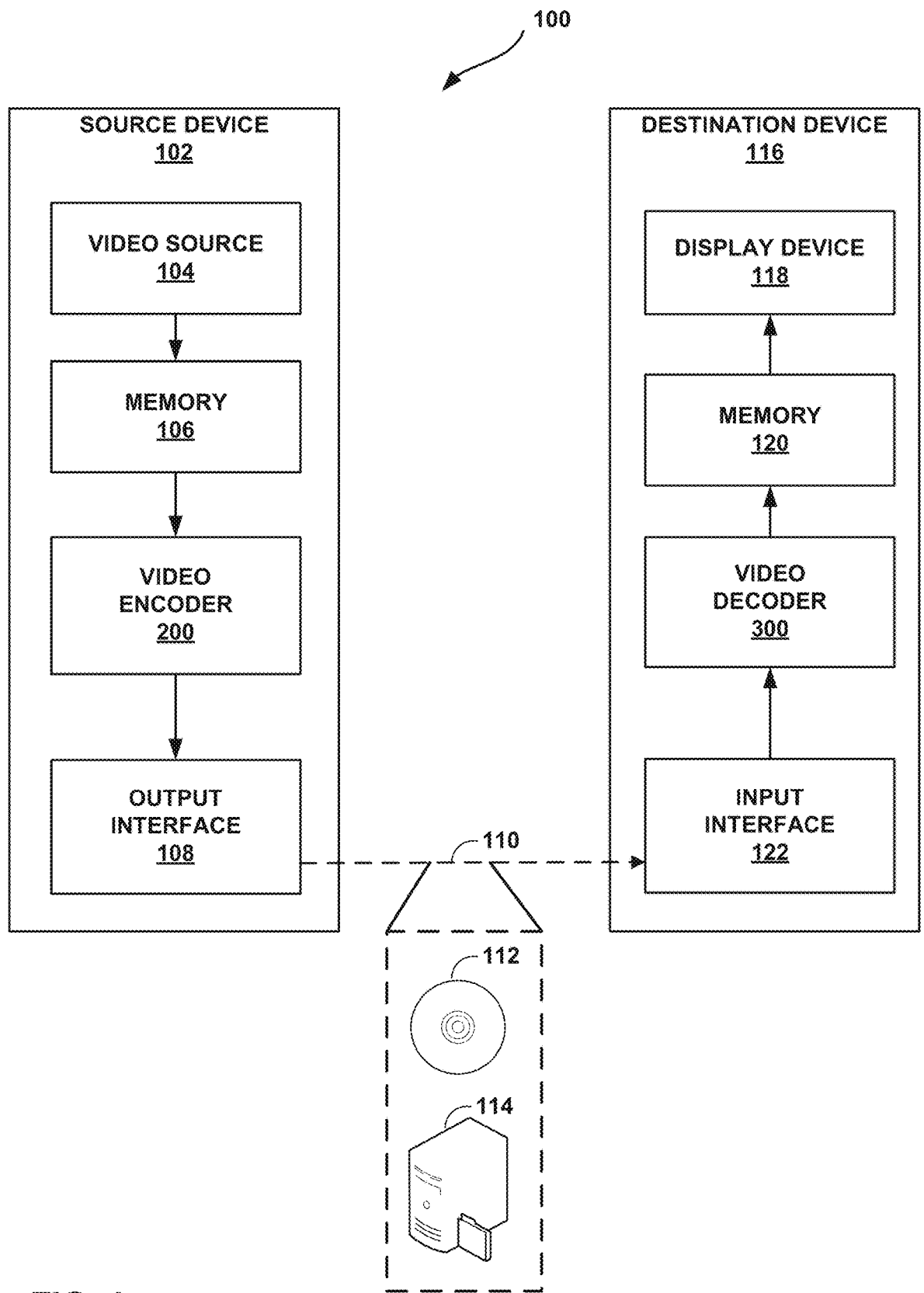
FIG. 1 is a block diagram illustrating an example video encoding and decoding system that may perform the techniques of this disclosure.

Various video coding standards, including the recently developed High Efficiency Video Coding (HEVC) standard and the versatile video coding (VVC) standard presently under development, include predictive coding modes for video blocks, where a block currently being coded (i.e., encoded or decoded) is predicted based on an already coded block of video data. In an intra prediction mode, the current block is predicted based on one or more previously coded, neighboring blocks in the same picture as the current block, while in an inter prediction mode the current block is predicted based on an already coded block in a different picture. In inter prediction mode, the process of determining a block of a previously coded frame to use as a predictive block is sometimes referred to as motion estimation, which is generally performed by a video encoder, and the process of identifying and retrieving a predictive block is sometimes referred to as motion compensation, which is performed by both video encoders and video decoders.

To generate the predictive block using intra prediction, the video coder (i.e., video encoder or video decoder) may determine values of samples of the predictive block based on a set of reference samples. The set of reference samples may include samples of the current picture that are in a column to the left of the current block and samples of the current picture that are in a row above the current block. The video coder uses the reference samples to determine the values of the samples of the predictive block in different ways depending on an intra prediction mode of the predictive block. Earlier implementations of intra prediction only used the row or column of samples immediately adjacent to the block being coded. Newer implementations of intra prediction, however, may utilize multiple reference lines and, additionally or alternatively, may also use lines that are not immediately adjacent to the block being coded.

This disclosure describes techniques for coding a block of video data using intra prediction, and more particularly, this disclosure describes several techniques for improving wide-angle intra prediction. The techniques of this disclosure potentially improve video coding quality by configuring video encoder and decoders to perform filtering, e.g., intra smoothing filtering, in more coding scenarios where such filtering is advantageous.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, video encoders typically perform video decoding as part of the processes of determining how to encode video data. Thus, unless stated to the contrary, it should not be assumed that a technique described with respect to video decoding cannot also be performed as part of video encoding, or vice versa.

This disclosure may also use terms such as current layer, current block, current picture, current slice, etc. In the context of this disclosure, the term current is intended to identify a block, picture, slice, etc. that is currently being coded, as opposed to, for example, previously or already coded blocks, pictures, and slices or yet to be coded blocks, pictures, and slices.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for wide-angle intra prediction smoothing and interpolation described in this disclosure. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for wide-angle intra prediction smoothing and interpolation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11,15$^{th}$ Meeting: Gothenburg, SE, 3-12 Jul. 2019, JVET-O2001-vE (hereinafter "VVC Draft 6"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
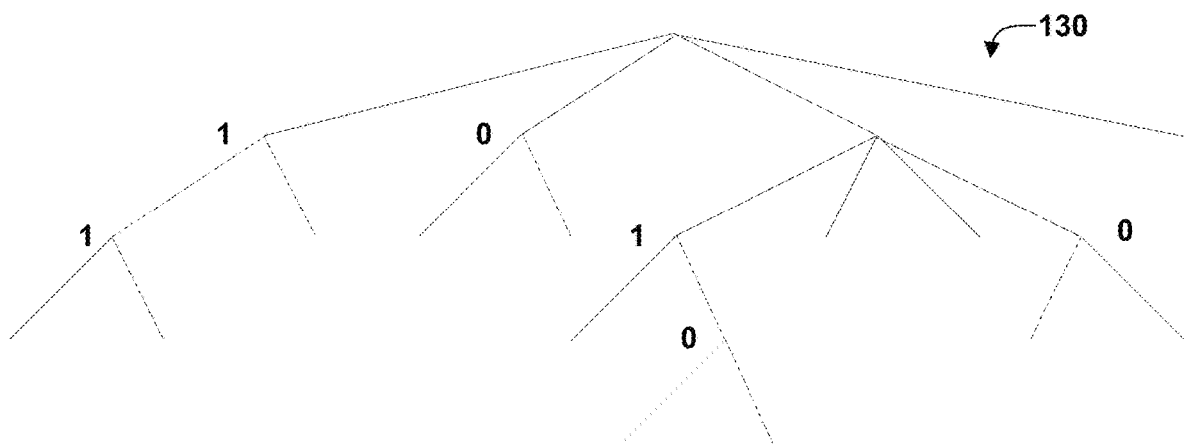
FIGS. 2A and 2B are conceptual diagrams illustrating an example quadtree binary tree (QTBT) structure, and a corresponding coding tree unit (CTU).
Figure 2B:
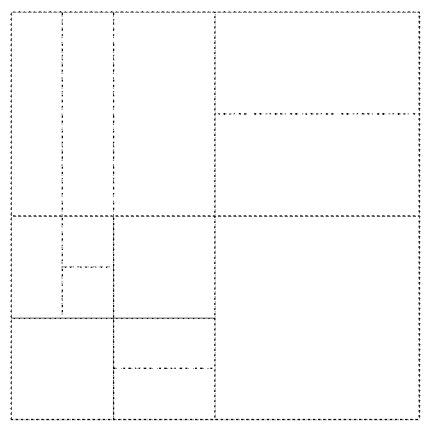

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction)

and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

This disclosure describes several techniques for improving wide-angle intra prediction. In wide-angle intra prediction, video encoder 200 and video decoder 300 may use prediction angles beyond the typical −135 degrees to 45 degrees angle to determine intra mode predicted samples.

Figure 3:
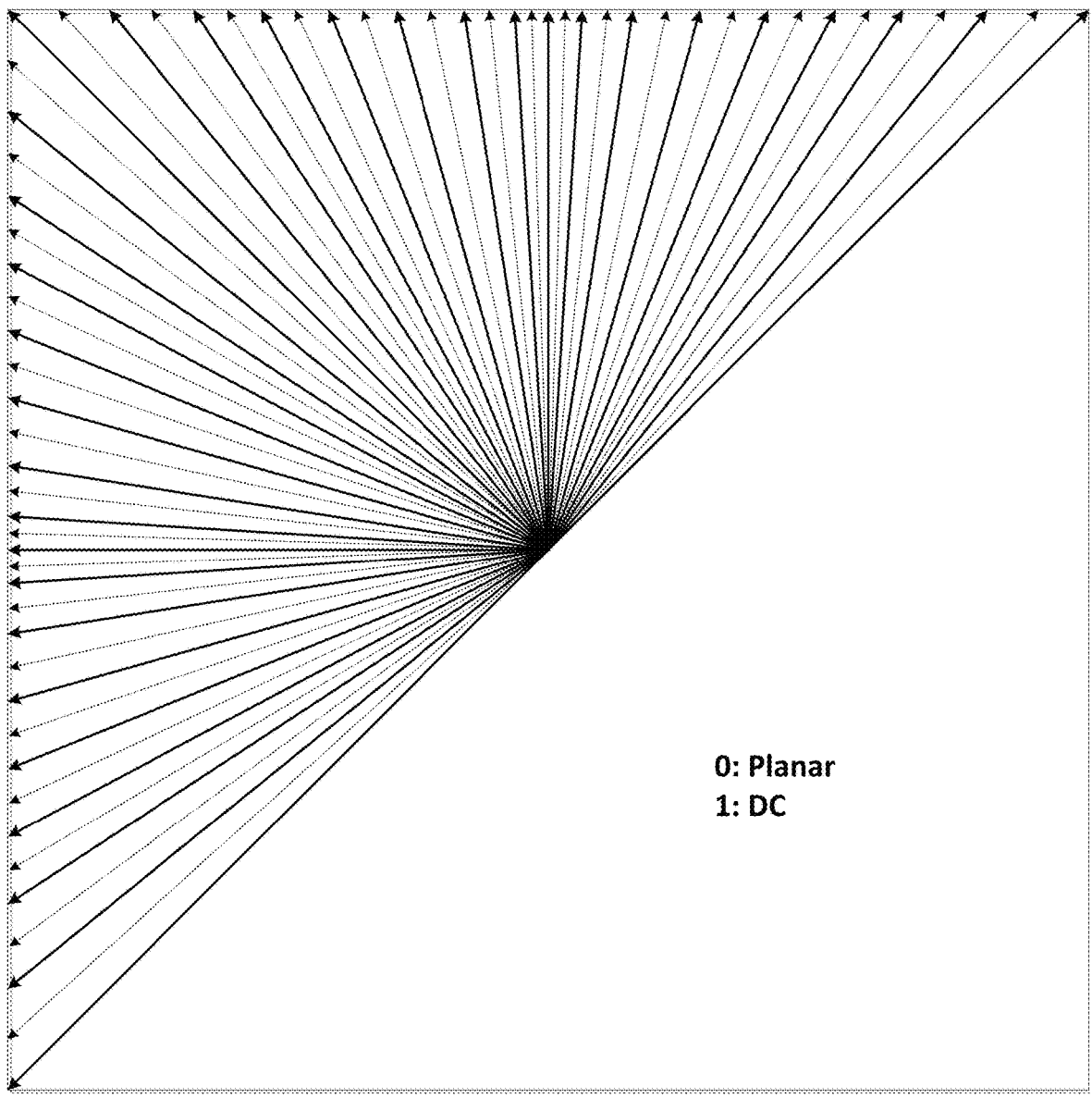
FIG. 3 shows examples of directions of intra prediction, where the arrows points towards the reference samples.

FIG. 3 shows examples of directions for intra prediction, where the arrows point towards the reference samples. FIG. 3 shows directional prediction modes for square blocks that use prediction angles between −135 degrees to 45 degrees of the current block, as described in J. Chen, Y. Ye, S. Kim, "Algorithm description for Versatile Video Coding and Test Model 2 (VTM2)," 11th JVET Meeting, Ljubljana, SI, July 2018, JVET-K1002. Intra prediction modes also include a DC prediction mode and a Planar prediction mode in addition to the directional (or angular) prediction modes shown in FIG. 3. As will be explained in more detail below, video encoder 200 and video decoder 300 may be configured to perform wide-angle intra prediction modes using additional angular prediction modes not shown in FIG. 3.

In VTM2, the block structure used for specifying the prediction block for intra prediction is not limited to being square. For a square block, width (w) equals height (h). Non-square, rectangular prediction blocks (w>h or w<h) may increase the coding efficiency based on the characteristics of the content.

In such rectangular blocks, restricting the direction of intra prediction to be within −135 degrees to 45 degrees may result in situations where farther reference samples are used for intra prediction rather than closer reference samples. Such a design may have an impact on coding efficiency. Thus, it may be beneficial to change the range of angle restrictions so that closer reference samples (beyond the −135 to 45 degree angle) may be used for prediction. An example of such a case is shown in FIG. 4.

Figure 4:
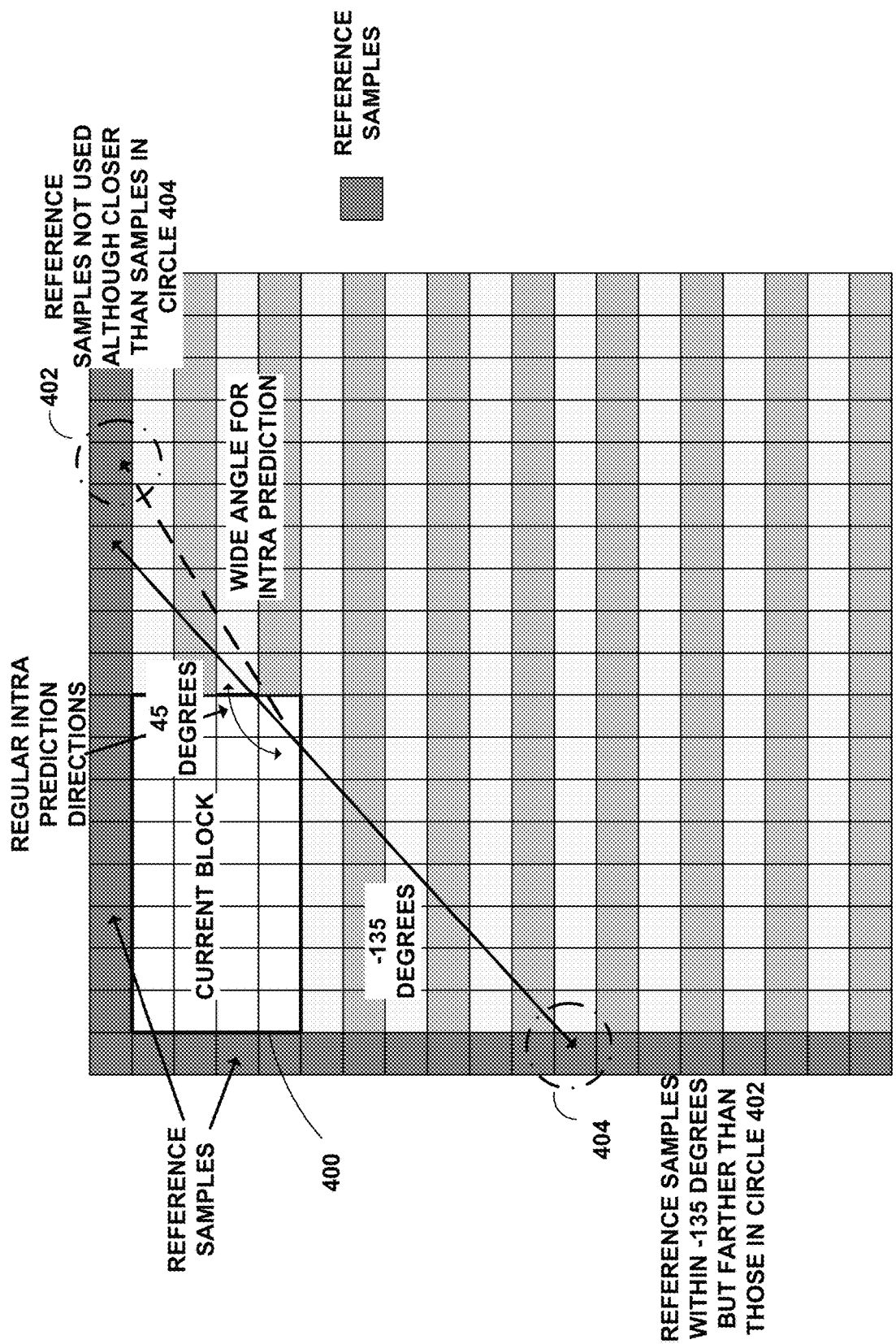
FIG. 4 shows an example of an 8×4 rectangular block where "closer" reference samples are not used for intra prediction, but farther reference samples may be used.

FIG. 4 shows an example of a 4×8 rectangular current block 400 where "closer" reference samples (circle 402) are not used, but farther reference samples (circle 404) may be used, due to a restriction of the intra prediction directions to be in the range of −135 degrees to 45 degrees.

During the 12$^{th}$ JVET meeting, a modification of wide-angle intra prediction was proposed in L. Zhao, X. Zhao, S. Liu, X. Li, "CE3-related: Unification of angular intra prediction for square and non-square blocks," 12$^{th}$ JVET Meeting, Macau SAR, CN, October 2018, JVET-L0279 and was adopted into VTM3. VTM3 is described in J. Chen, Y. Ye, S. Kim, "Algorithm description for Versatile Video Coding and Test Model 3 (VTM3)," 12$^{th}$ JVET Meeting, Macau SAR, CN, October 2018, JVET-L1002.

Figure 5A:
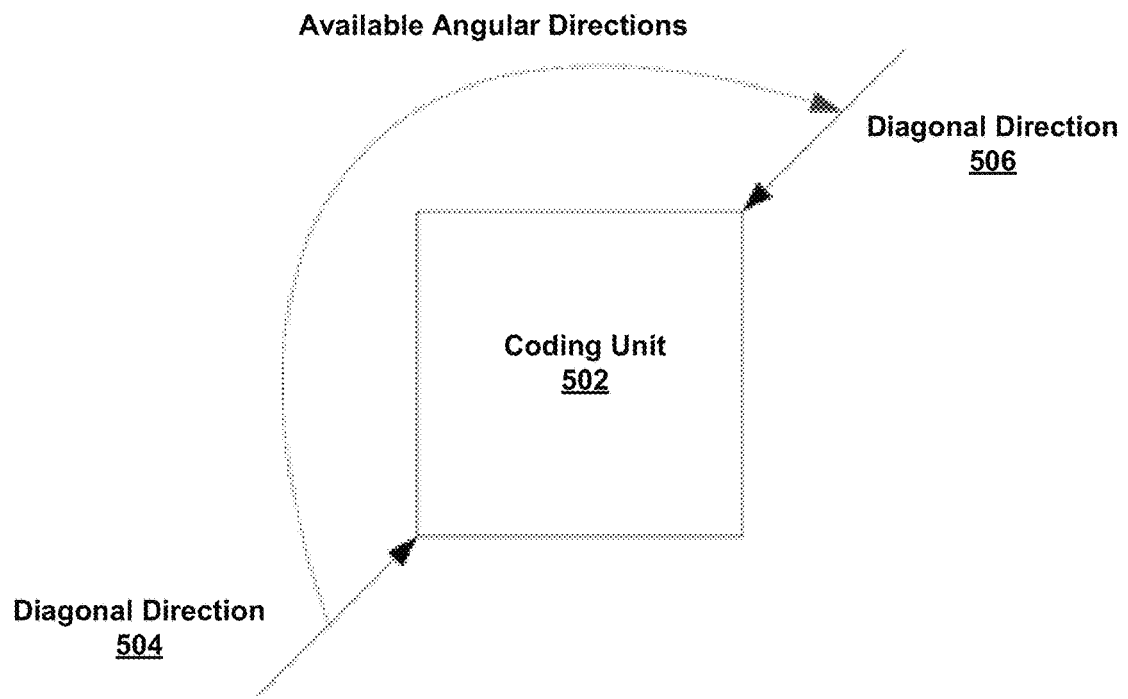
FIGS. 5A-5C show examples of mode mapping processes for modes outside the diagonal direction range.
Figure 5B:
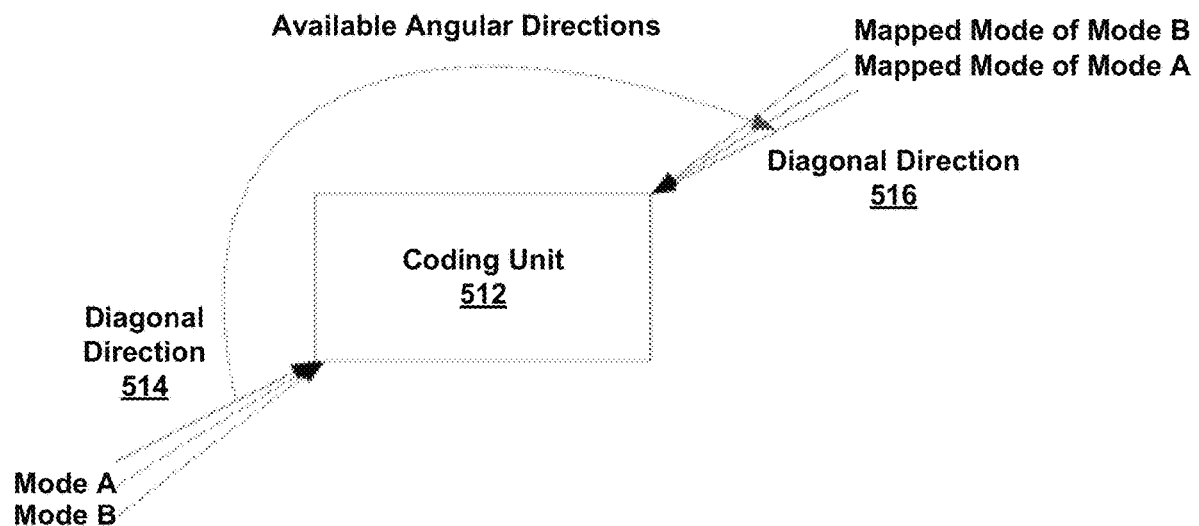
Figure 5C:
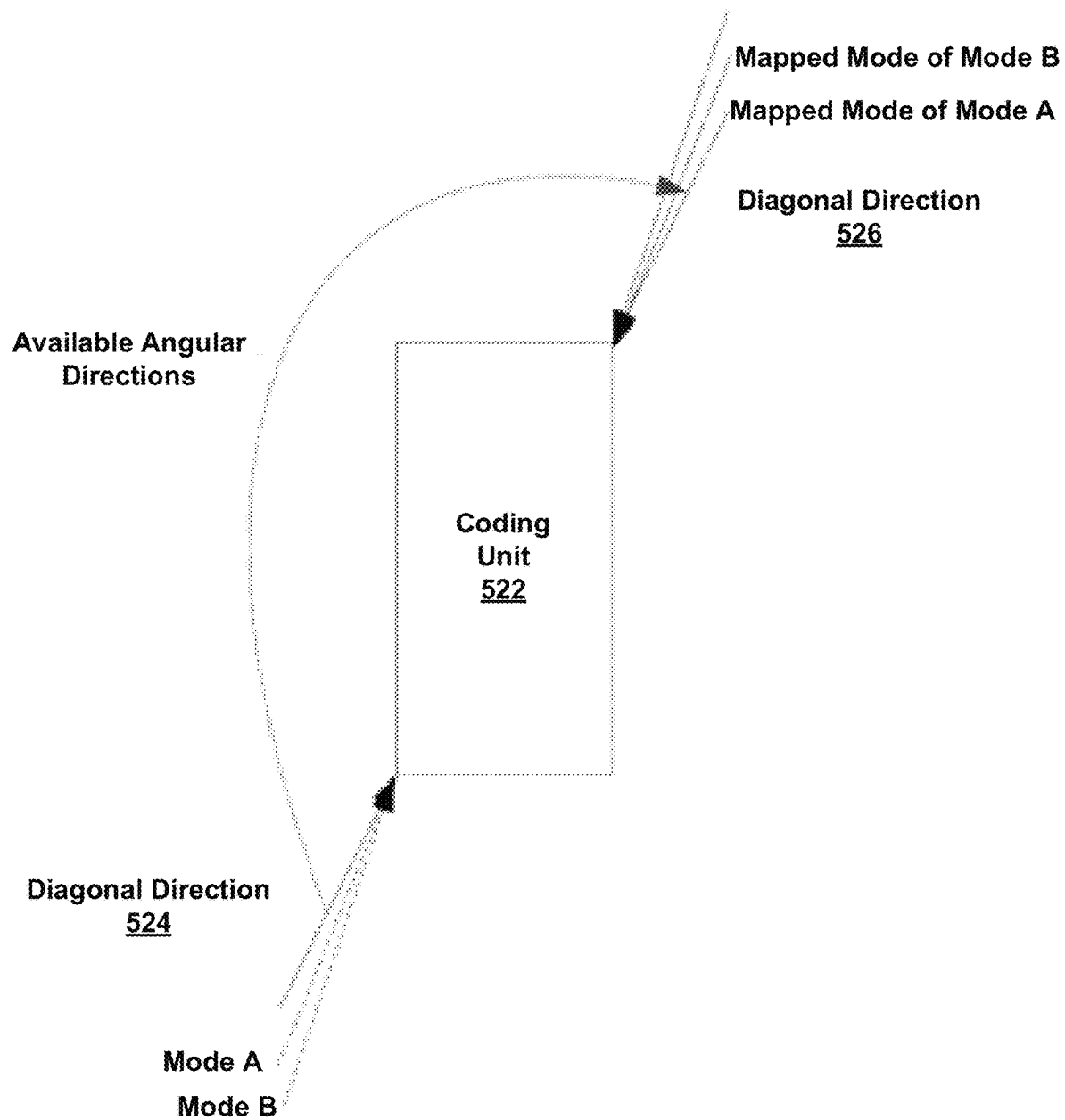

This proposal included two modifications to unify the angular intra prediction for square and non-square blocks. First, angular prediction directions were modified to cover diagonal directions of all block shapes. Secondly, all angular directions were kept within the range between the bottom-left diagonal direction and the top-right diagonal direction for all block aspect ratios (square and non-square) as illustrated in FIGS. 5A-5C. In addition, the number of reference samples in the top reference row and left reference column can be restricted to 2*width+1 and 2*height+1 for all block shapes.

FIGS. 5A-5C show examples of a mode mapping processes for modes outside the diagonal direction range. Video encoder 200 and video decoder 300 may implement a mode mapping process to determine the available intra-prediction modes for various shapes and sized of CUs. FIG. 5A shows a square block that does not require angular mode remapping. FIG. 5B shows an angular mode remapping for a horizontal non-square block. FIG. 5C shows an angular mode remapping for a vertical non-square block. In FIGS. 5B and 5C, modes A and B are replaced by mapped modes A and B, such that there are still only 65 available angular modes, but those 65 available modes are different between FIGS. 5A, 5B, and 5C.

In the example of FIG. 5A, CU 502 is a square block (i.e., w=h). Diagonal direction 504 corresponds to a 45 degree prediction angle, and diagonal direction 506 corresponds to a −135 degree prediction angle. All available prediction modes for CU 502 are between diagonal direction 504 and diagonal prediction 506, and thus, no mode remapping is needed.

In the example of FIG. 5B, CU 512 is a non-square, rectangular block, where w is greater than h. Diagonal direction 514 represents the diagonal direction running from the bottom-left corner of CU 512 to the top-right corner of CU 512, and diagonal direction 516 represents the diagonal direction running from the top-right corner of CU 512 to the bottom-left corner of CU 512. As modes A and B are not between diagonal directions 514 and 516, modes A and B are replaced by mapped modes A and B, such that all available prediction modes for CU 512 are between diagonal direction 514 and diagonal direction 516.

In the example of FIG. 5C, CU 522 is a non-square, rectangular block, where h is greater than w. Diagonal direction 524 represents the diagonal direction running from the bottom-left corner of CU 522 to the top-right corner of CU 522, and diagonal direction 526 represents the diagonal direction running from the top-right corner of CU 522 to the bottom-left corner of CU 522. As modes A and B are not between diagonal directions 524 and 526, modes A and B are replaced by mapped modes A and B, such that all available prediction modes for CU 522 are between diagonal direction 524 and diagonal direction 526.

Figure 6:
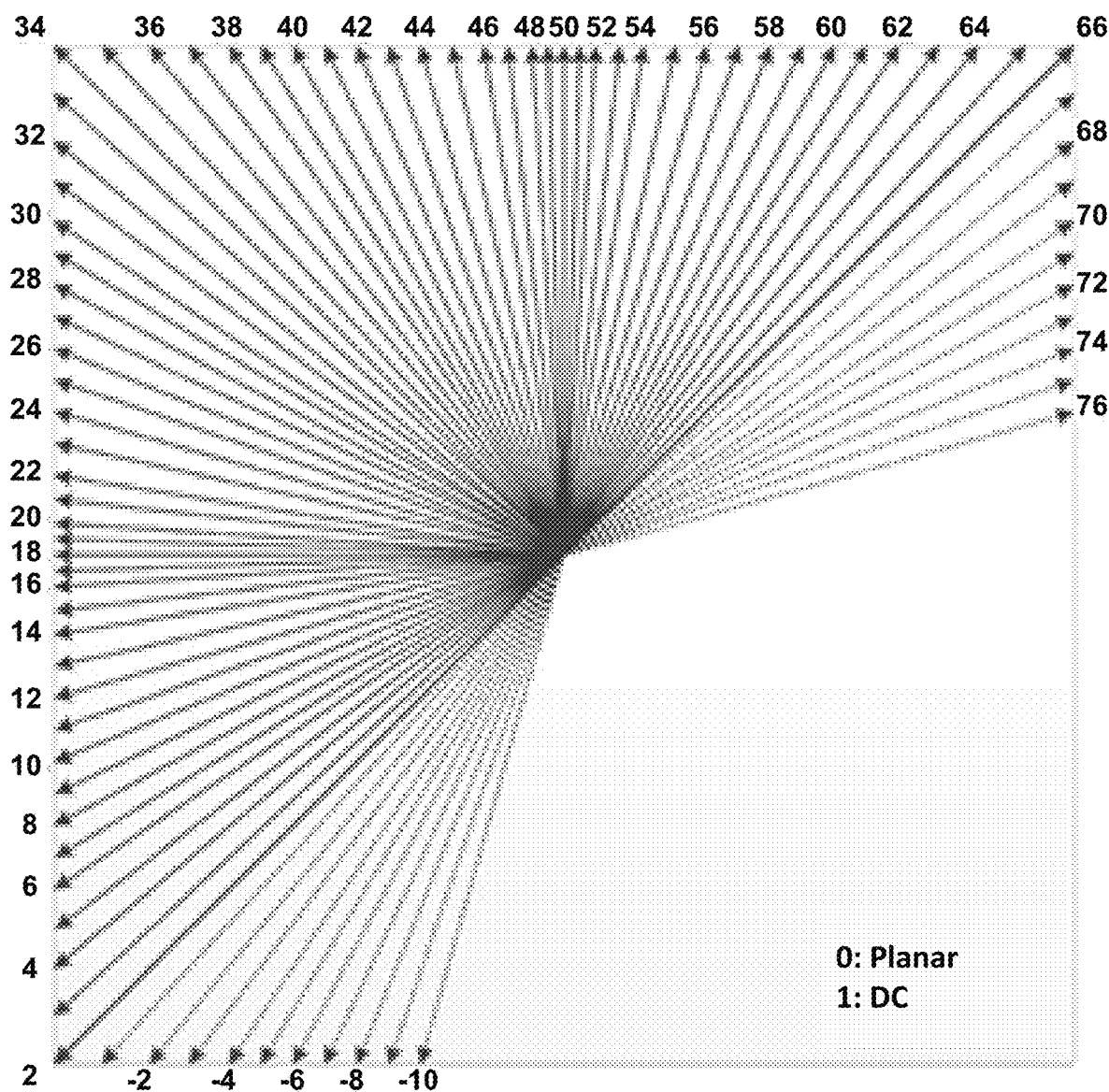
FIG. 6 is an illustration of wide angles for intra prediction.

FIG. 6 is an illustration of wide angles that are adopted in VTM2. FIG. 6 shows wide-angle modes (labeled −1 to −10 and 67 to 76 in FIG. 6) depicted in addition to the 65 angular modes. In the example of FIG. 6, mode 50 corresponds to a prediction angle of −90 degrees. Mode 66 corresponds to a prediction angle of −135 degrees, and mode 2 corresponds to a prediction angle of 45 degrees.

Figure 7:
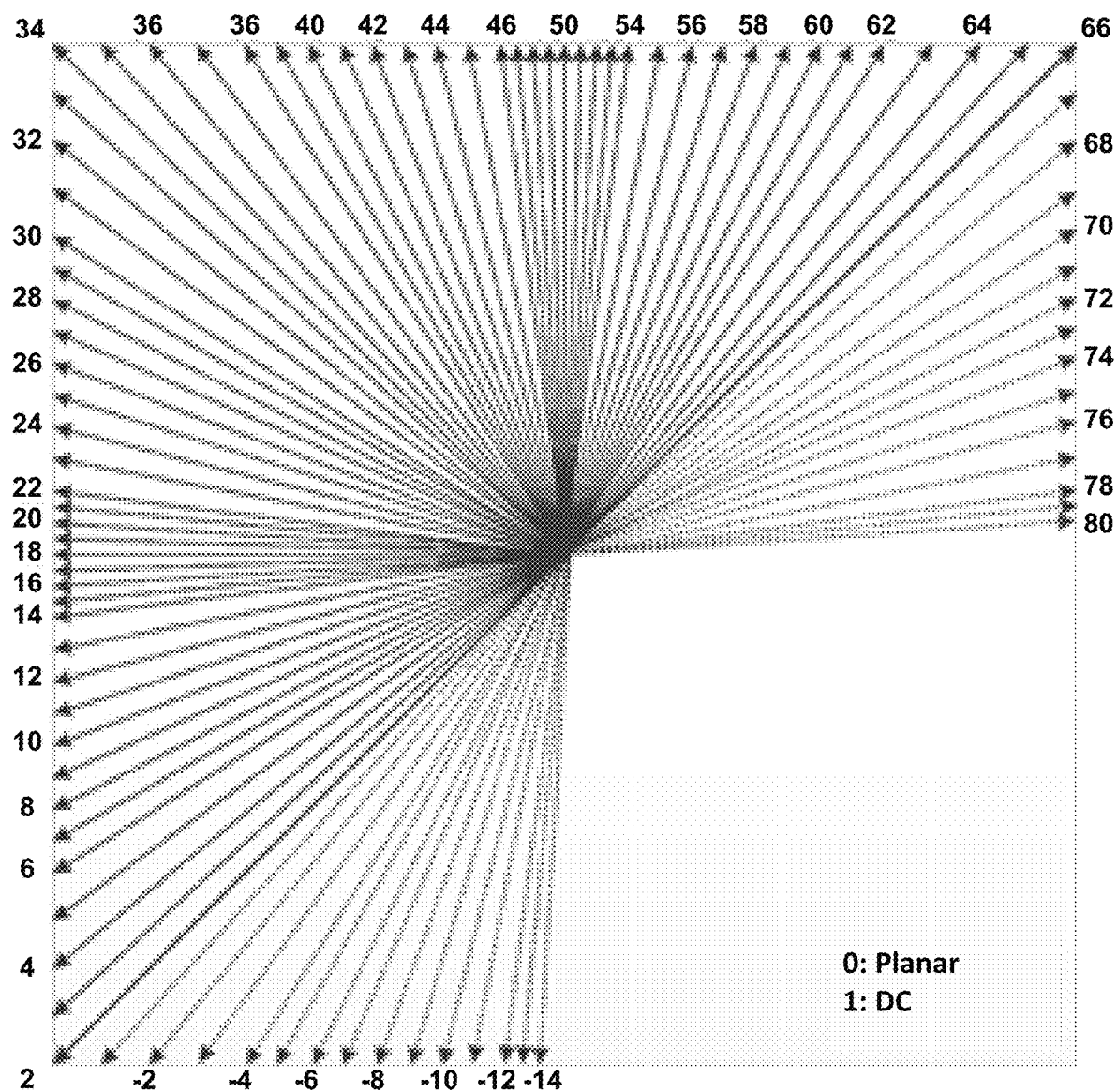
FIG. 7 is an illustration of wide angles for intra prediction.

FIG. 7 shows an example of wide angles (labeled −1 to −14 and 67 to 80 in FIG. 7) in VTM3 beyond modes 2 and 66 for a total of 93 angular modes. In the example of FIG. 7, mode 50 corresponds to a prediction angle of −90 degrees. Mode 66 corresponds to a prediction angle of −135 degrees, and mode 2 corresponds to a prediction angle of 45 degrees.

FIG. 7 shows an illustration of wider angles that are adopted in VTM3. Although VTM3 defines 95 modes, for any block size only 67 modes are allowed. The exact modes that are allowed depend on the block width and height ratio. This is achieved by restricting the mode range based on block size.

Table 1 specifies the mapping table between predModeIntra and the angle parameter intraPredAngle in VTM3. VTM3 is described in B. Bross, J. Chen, S. Liu, "Versatile Video Coding (Draft 3)," 12$^{th}$ WET Meeting, Macau SAR, CN, October 2018, JVET-L1001 and is hereby incorporated by reference in its entirety.

The angular modes corresponding with non-square block diagonals are shown with a caret symbol (A). The vertical and horizontal modes are shown with a pound sign (#) for reference. Square block diagonal modes are shown in Table 1 with an asterisk (*).

The inverse angle parameter invAngle is derived based on intraPredAngle as follows:

$$invAngle = \text{Round}\left(\frac{256 * 32}{intraPredAngle}\right) \quad (1\text{-}1)$$

Note that intraPredAngle values that are multiples of 32 (0, 32, 64, 128, 256, 512) correspond with prediction from non-fractional reference array samples, as is the case in the VTM3 specification.

Table 2 shows diagonal modes corresponding with various block aspect ratios.

| Block aspect ratio (W/H) | Diagonal modes |
|---|---|
| 1 (square) | 2, 34, 66 |
| 2 | 8, 28, 72 |
| 4 | 12, 24, 76 |
| 8 | 14, 22, 78 |
| 16 | 16, 20, 80 |
| ½ | −6, 40, 60 |
| ¼ | −10, 44, 56 |
| ⅛ | −12, 46, 54 |
| 1/16 | −14, 48, 52 |

Video encoder 200 and video decoder 300 may be configured to perform mode-dependent intra smoothing (MDIS) and reference sample interpolation. A smoothing filter generally alters sample values in a manner that reduces the

| | predModeIntra | | | |
|---|---|---|---|---|
| | −14^ | −13 | −12^ | −11 |
| intraPredAngle | 512^ | 341 | 256^ | 171 |

| | predModeIntra | | | | | | | | | | | | | | | |
|---|---|---|---|---|---|---|---|---|---|---|---|---|---|---|---|---|
| | −10^ | −9 | −8 | −7 | −6^ | −5 | −4 | −3 | −2 | −1 | 2* | 3 | 4 | 5 | 6 | 7 | 8^ |
| intraPredAngle | 128^ | 102 | 86 | 73 | 64^ | 57 | 51 | 45 | 39 | 35 | 32* | 29 | 26 | 23 | 20 | 18 | 16^ |

| | predModeIntra | | | | | | | | | | | | | | | |
|---|---|---|---|---|---|---|---|---|---|---|---|---|---|---|---|---|
| | 9 | 10 | 11 | 12^ | 13 | 14^ | 15 | 16^ | 17 | 18# | 19 | 20^ | 21 | 22^ | 23 | 24^ | 25 |
| intraPredAngle | 14 | 12 | 10 | 8^ | 6 | 4^ | 3 | 2^ | 1 | 0# | −1 | −2^ | −3 | −4^ | −6 | −8^ | −10 |

| | predModeIntra | | | | | | | | | | | | | | | |
|---|---|---|---|---|---|---|---|---|---|---|---|---|---|---|---|---|
| | 26 | 27 | 28^ | 29 | 30 | 31 | 32 | 33 | 34* | 35 | 36 | 37 | 38 | 39 | 40 | 41 | 42 |
| intraPredAngle | −12 | −14 | −16^ | −18 | −20 | −23 | −26 | −29 | −32* | −29 | −26 | −23 | −20 | −18 | −16 | −14 | −12 |

| | predModeIntra | | | | | | | | | | | | | | | |
|---|---|---|---|---|---|---|---|---|---|---|---|---|---|---|---|---|
| | 43 | 44^ | 45 | 46^ | 47 | 48^ | 49 | 50# | 51 | 52^ | 53 | 54^ | 55 | 56^ | 57 | 58 | 59 |
| intraPredAngle | −10 | −8^ | −6 | −4^ | −3 | −2^ | −1 | 0# | 1 | 2^ | 3 | 4^ | 6 | 8^ | 10 | 12 | 14 |

| | predModeIntra | | | | | | | | | | | | | | | |
|---|---|---|---|---|---|---|---|---|---|---|---|---|---|---|---|---|
| | 60^ | 61 | 62 | 63 | 64 | 65 | 66* | 67 | 68 | 69 | 70 | 71 | 72^ | 73 | 74 | 75 | 76^ |
| intraPredAngle | 16^ | 18 | 20 | 23 | 26 | 29 | 32* | 35 | 39 | 45 | 51 | 57 | 64^ | 73 | 86 | 102 | 128^ |

| | predModeIntra | | | |
|---|---|---|---|---|
| | 77 | 78^ | 79 | 80^ |
| intraPredAngle | 171 | 256^ | 341 | 512^ | variation between the samples. An interpolation filter, by contrast, determines sample values, from known sample values, for locations (e.g., locations between samples) where sample values are either not known or do not exists. In HEVC, before intra prediction, the neighboring reference samples are potentially filtered using a 2-tap linear or 3-tap (1,2,1)/4 filter. This process is known as intra reference smoothing, MDIS. In MDIS, given the intra prediction mode index predModeIntra and block size nTbS, video encoder 200 and video decoder 300 determine whether the reference smoothing process is performed, and if so which smoothing filter is used. The following text is the related paragraph from the HEVC specification:

"8.4.4.2.3 Filtering Process of Neighbouring Samples

Inputs to this process are:
  the neighbouring samples p[x][y], with x=−1, y=−1 . . . nTbS*2−1 and x=0 . . . nTbS*2−1, y=−1,
  a variable nTbS specifying the transform block size.

Outputs of this process are the filtered samples pF[x][y], with x=−1, y=−1 . . . nTbS*2−1 and x=0 . . . nTbS*2−1, y=−1.

The variable filterFlag is derived as follows:
  If one or more of the following conditions are true, filterFlag is set equal to 0:
    predModeIntra is equal to INTRA DC.
    nTbS is equal 4.
  Otherwise, the following applies:
    The variable minDistVerHor is set equal to Min(Abs (predModeIntra−26), Abs(predModeIntra−10)).
    The variable intraHorVerDistThres[nTbS] is specified in Table 8-3.
    The variable filterFlag is derived as follows:
      If minDistVerHor is greater than intraHorVerDistThres[nTbS], filterFlag is set equal to 1.
      Otherwise, filterFlag is set equal to 0.

TABLE 8-3

Specification of intraHorVerDistThres[ nTbS ] for various transform block sizes

|  | nTbS = 8 | nTbS = 16 | nTbS = 32 |
|---|---|---|---|
| intraHorVerDistThres[ nTbS ] | 7 | 1 | 0 |

When filterFlag is equal to 1, the following applies:
The variable biIntFlag is derived as follows:
  If all of the following conditions are true, biIntFlag is set equal to 1:
    strong_intra_smoothing_enabled_flag is equal to 1
    nTbS is equal to 32
    Abs(p[−1][−1]+p[nTbS*2−1][−1]−2*p[nTbS−1][−1])<(1<<(BitDepthy−5))
    Abs(p[−1][−1]+p[−1][nTbS*2−1]−2*p[−1][nTbS−1])<(1<<(BitDepthy−5))
  Otherwise, biIntFlag is set equal to 0.
The filtering is performed as follows:
  If biIntFlag is equal to 1, the filtered sample values pF[x][y] with x=−1, y=−1 . . . 63 and x=0 . . . 63, y=−1 are derived as follows:

$pF[-1][-1]=p[-1][-1]$ (8-30)

$pF[-1][y]=((63-y)*p[-1][-1]+(y+1)*p[-1][63]+32)>>6 \text{ for } y=0 \ldots 62$ (8-31)

$pF[-1][63]=p[-1][63]$ (8-32)

$pF[x][-1]=((63-x)*p[-1][-1]+(x+1)*p[63][-1]+32)>>6 \text{ for } x=0 \ldots 62$ (8-33)

$pF[63][-1]=p[63][-1]$ (8-34)

Otherwise (biIntFlag is equal to 0), the filtered sample values pF[x][y] with x=−1, y=−1 . . . nTbS*2−1 and x=0 . . . nTbS*2−1, y=−1 are derived as follows:

$pF[-1][-1]=(p[-1][0]+2*p[-1][-1]+p[0][-1]+2)>>2$ (8-35)

$pF[-1][y]=(p[-1][y+1]+2*p[-1][y]+p[-1][y-1]+2)>>2 \text{ for } y=0 \ldots nTbS*2-2$ (8-36)

$pF[-1][nTbS*2-1]=p[-1][nTbS*2-1]$ (8-37)

$pF[x][-1]=(p[x-1][-1]+2*p[x][-1]+p[x+1][-1]+2)>>2 \text{ for } x=0 \ldots nTbS*2-2$ (8-38)

$pF[nTbS*2-1][-1]=p[nTbS*2-1][-1]$ (8-39)"

In the example above, filterFlag set to 0 means MDIS is not performed, and filterFlag set to 1 means MDIS is performed.

During Joint Video Exploration Team (JVET) activities, the Joint Exploration Test Model version 7 (JEM7) was drafted to include the following version of the MDIS table for luma blocks:

| sizeIndex | Threshold[sizeIndex] |
|---|---|
| 0 | 20 |
| 1 | 20 |
| 2 | 14 |
| 3 | 2 |
| 4 | 0 |
| 5 | 20 |
| 6 | 0 |

JEM7 is described in J. Chen, E. Alshina, G. J. Sullivan, J.-R. Ohm, J. Boyce, "Algorithm description of Joint Exploration Test Model 7," 7th JVET Meeting, Torino, Italy, July 2017, JVET-G1001, which is hereby incorporated by reference in its entirety.

Video encoder 200 and video decoder 300 may be configured to determine a size index, according to JEM 7, as follows:

sizeIndex=(log 2(BlockWidth)−2+log 2(BlockHeight)−2)/2+2−1

Video encoder 200 and video decoder 300 may be configured to determine whether to apply the [1 2 1]/4 smoothing filter to the intra reference samples by determining an intra mode difference value as follows:

IntraModeDiff=min(abs(IntraModeIdx−HOR_IDX), abs(IntraModeIdx−VER_IDX))

In JEM7 as well as in FIGS. 6 and 7, HOR_IDX=18 and VER_IDX=50, because JEM7 has 65 directional intra modes (IntraModeIdx 2-66) in addition to planar (IntraModeIdx=0) and DC (IntraModeIdx=1) modes.

Video encoder 200 and video decoder 300 may be configured to determine whether to apply the smoothing filter based on the following condition:

IF IntraModeDiff>Threshold[sizeIndex] THEN "apply smoothing filter"

VTM3 includes the following MDIS table:

| sizeIndex | Threshold[sizeIndex] |
|---|---|
| 0 | 20 |
| 1 | 20 |
| 2 | 20 |
| 3 | 14 |
| 4 | 2 |

-continued

| sizeIndex | Threshold[sizeIndex] |
|---|---|
| 5 | 0 |
| 6 | 0 |
| 7 | 0 |

The block size index is defined as follows in VTM3:

sizeIndex=(log 2(BlockWidth)+log 2(BlockHeight))/2

Video encoder 200 and video decoder 300 may be configured to determine whether to apply the [1 2 1]/4 smoothing filter to the non-fractional intra reference samples or switch the interpolation filters between smoothing (e.g., Gaussian interpolation) and non-smoothing (e.g., cubic interpolation) for fractional reference sample positions as follows and as described in U.S. Provisional Patent Application 62/731,723 filed 14 Sep. 2018 and A. Filippov et al., G. Van der Auwera et al., "CE3: A combination of tests 3.1.2 and 3.1.4 for intra reference sample interpolation filter," 12th JVET Meeting, Macau SAR, CN, October 2018, JVET-L0628:

IntraModeDiff=min(abs(IntraModeIdx−HOR_IDX), abs(IntraModeIdx−VER_IDX))

with HOR_IDX=18 and VER_IDX=50 and the condition:
IF IntraModeDiff>Threshold[sizeIndex] THEN "apply smoothing"

In VTM3, for wide-angle modes with index<2 or >66, the intra smoothing condition is set equal to true. The reason is that two vertically-adjacent predicted samples may use two non-adjacent reference samples in the case of wide-angle intra prediction.

Existing techniques for implementing wide-angular modes have potential problems. For example, for wide-angular modes in VTM3, reference sample intra smoothing is enabled according to the MDIS conditions described above. However, VTM3 introduces several wide-angular diagonal modes for non-square blocks that result in prediction from non-fractional (i.e., integer) neighboring reference sample array positions (see Table 2). This is also the case if multiple reference lines are used for prediction in VTM3.

If in a typical implementation, the interpolation filters (smoothing or non-smoothing) are applied only if the prediction is from fractional neighboring reference samples, then the wide-angular diagonal modes that are predicted from non-fractional reference sample positions will not be predicted from smoothed reference samples.

The following techniques are proposed to address the problems introduced above. The described techniques may be applicable to luma and/or chroma prediction.

According to one example, an exception may be created for the wide-angular modes that correspond with the diagonals of non-square blocks and that are predicted from non-fractional reference sample positions by pre-filtering the reference samples with a smoothing filter, such as the 3-tap smoothing filter [1 2 1]/4. In this case, video encoder 200 and video decoder 300 may be configured to determine that the smoothing or non-smoothing interpolation filtering is not applied, and the non-fractional samples are copied from the reference sample arrays into the prediction block array. For example, this exception can be created for the wide-angular modes −6, −10, −12, −14, 72, 76, 78, 80 included in Table 1. Thus, video encoder 200 and video decoder 300 may be configured to perform intra prediction with wide-angular modes differently than intra prediction with other angular modes.

In some example, video encoder 200 and video decoder 300 may be configured to apply no filtering to the aforementioned non-fractional wide-angle modes, which means that non-fractional unfiltered reference samples are copied into the prediction block. Similarly, the smoothing filtering for non-fractional non-wide-angular (square block diagonals) modes 2, 34, 66 in Table 1 may be omitted for consistency with the non-fractional wide-angular modes.

In some examples, video encoder 200 and video decoder 300 may be configured to set the zero-phase of the smoothing interpolation filter equal to the smoothing filter, for example [1 2 1 0]/4 (4-tap filter). In this case, the smoothing interpolation filter is employed in the prediction from both non-fractional and fractional sample positions in the reference sample arrays without exception. Similarly, the zero-phase (identity filter, for example with filter taps [0 1 0 0] in case of a 4-tap filter) of the non-smoothing interpolation filter can be applied in non-fractional positions for other modes.

In some examples, video encoder 200 and video decoder 300 may be configured to apply the intra smoothing filter 'on-the-fly' in case of prediction from non-fractional reference sample positions, for example the 3-tap filter with taps [1 2 1]/4, when predicting from a non-fractional sample position. In this example, both the pre-filtering of reference samples and the interpolation filtering are by-passed for non-fractional positions.

In the proposed techniques described above, the intra smoothing filter with taps [1 2 1]/4 is used as an example. Alternative intra smoothing filtering may result in better prediction, such as filters with stronger smoothing properties and/or that have a wider support (more filter taps), for example the filter with taps [1 3 3 1]/8. Similarly, interpolation filtering with a wider support may result in better prediction for wide-angle modes.

The MDIS condition for wide-angle modes is the following in VTM3: "If mode index<2 or >66, the intra smoothing condition is set equal to true." It is proposed to integrate this wide-angle condition with the MDIS angle difference condition as follows:
The block size index is defined as follows:

sizeIndex=(log 2(BlockWidth)+log 2(BlockHeight))/2

Whether to apply, for example, the [1 2 1]/4 smoothing filter to the non-fractional intra reference samples or switch the interpolation filters between smoothing (e.g., Gaussian interpolation) and non-smoothing (e.g., cubic interpolation) for fractional reference sample positions is determined as follows (see U.S. Provisional Patent Application 62/731,723 filed 14 Sep. 2018 and A. Filippov et al., G. Van der Auwera et al., "CE3: A combination of tests 3.1.2 and 3.1.4 for intra reference sample interpolation filter," 12th JVET Meeting, Macau SAR, CN, October 2018, JVET-L0628):

IntraModeDiff=min(abs(IntraModeIdx−HOR_IDX), abs(IntraModeIdx−VER_IDX))

with HOR_IDX=18 and VER_IDX=50 and the condition:
IF Intra.ModeDiff>Threshold[sizeIndex] THEN "apply smoothing"
With the table entries for sizeIndex 0, 1, 2 modified to the value 16, so that the wide-angle modes are always smoothed for all block sizes:

| sizeIndex | Threshold[sizeIndex] |
|---|---|
| 0 | 20 → 16 |
| 1 | 20 → 16 |
| 2 | 20 → 16 |
| 3 | 14 |
| 4 | 2 |
| 5 | 0 |
| 6 | 0 |
| 7 | 0 |

Figure 8:
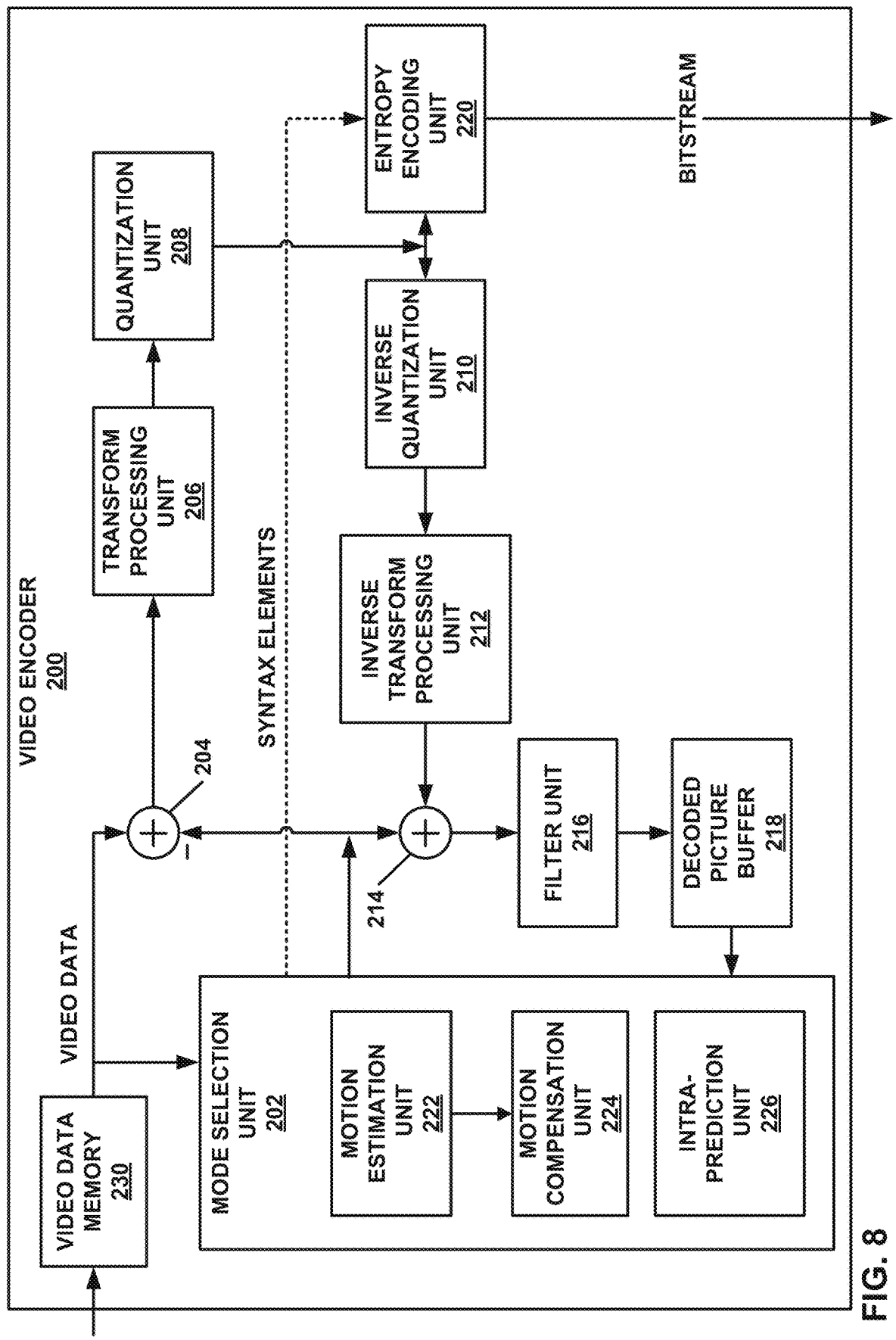
FIG. 8 is a block diagram illustrating an example video encoder that may perform the techniques of this disclosure.

FIG. 8 is a block diagram illustrating an example video encoder 200 that may perform the techniques of this disclosure. FIG. 8 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 8, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 8 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As explained in greater detail elsewhere in this disclosure, intra-prediction unit 226 may perform wide-angle intra prediction and may be configured to perform smoothing filtering for wide-angle intra prediction modes. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block. Thus, Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 9:
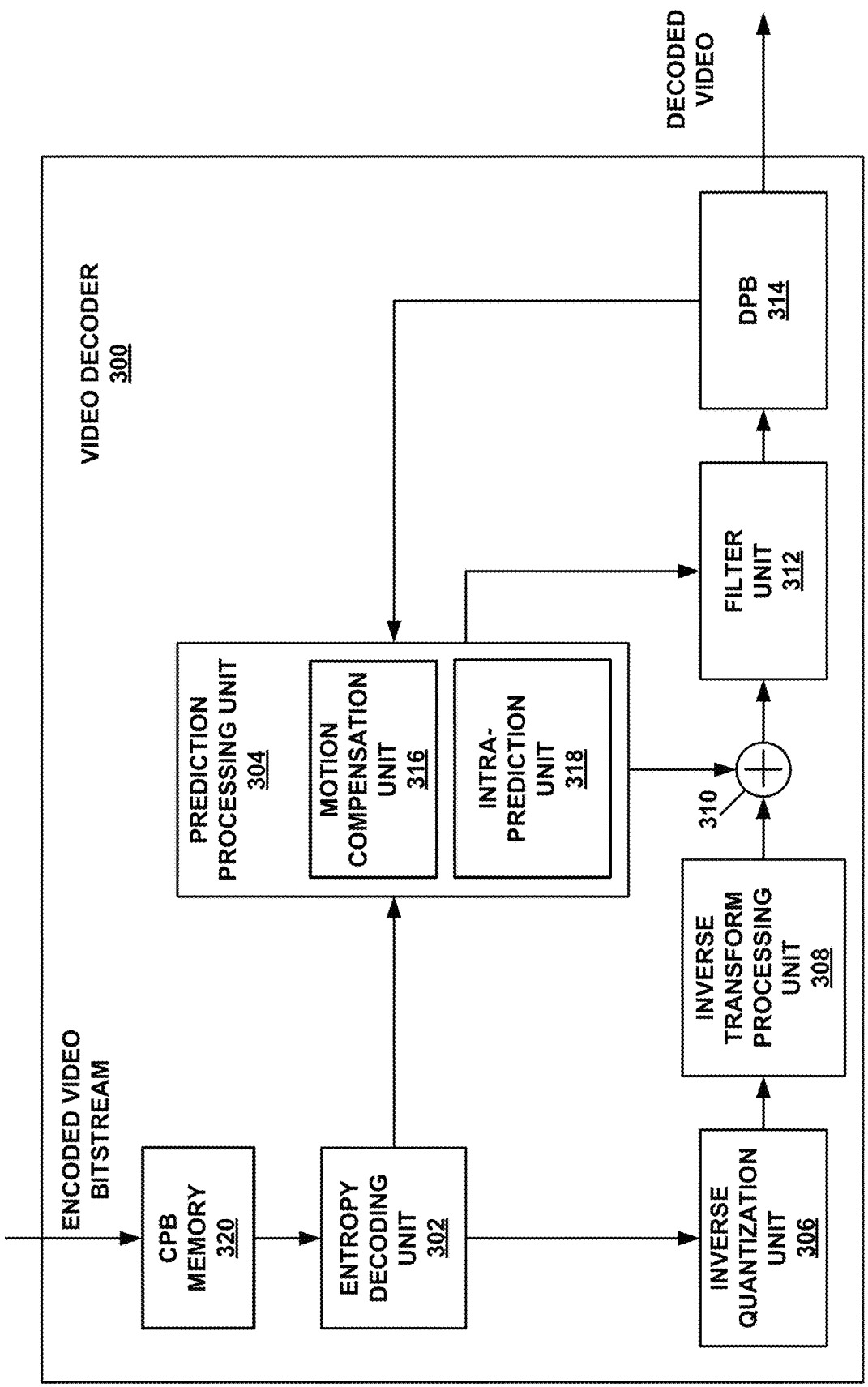
FIG. 9 is a block diagram illustrating an example video decoder that may perform the techniques of this disclosure.

FIG. 9 is a block diagram illustrating an example video decoder 300 that may perform the techniques of this disclosure. FIG. 9 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 9, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 9 are illustrated to assist with understanding the operations performed by video decoder 300. The units may be implemented as fixed-function circuits, programmable circuits, or a combination thereof. Similar to FIG. 8, fixed-function circuits refer to circuits that provide particular functionality, and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 8).

As another example, if the prediction information syntax elements indicate that the current block is intra-predicted, intra-prediction unit 318 may generate the prediction block according to an intra-prediction mode indicated by the prediction information syntax elements. As explained in greater detail elsewhere in this disclosure, intra-prediction unit 318 may perform wide-angle intra prediction and may be configured to perform smoothing filtering for wide-angle intra prediction modes. Again, intra-prediction unit 318 may generally perform the intra-prediction process in a manner that is substantially similar to that described with respect to intra-prediction unit 226 (FIG. 8). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

Figure 10:
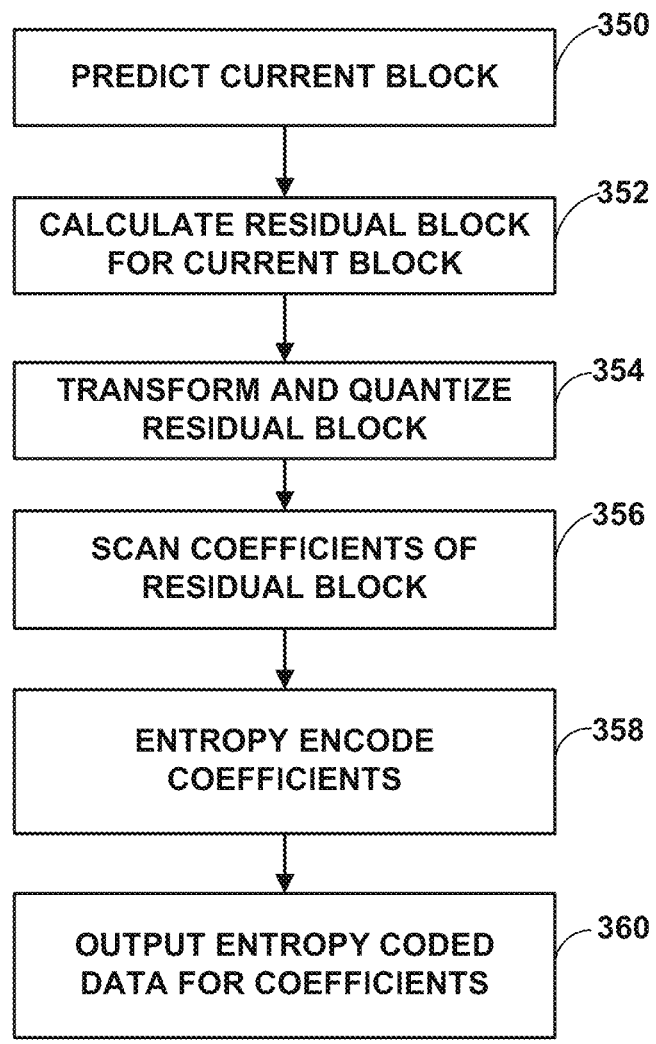
FIG. 10 is a flowchart illustrating an example process for encoding a current block of video data.

FIG. 10 is a flowchart illustrating an example process for encoding a current block of video data. The current block may include a current CU. Although described with respect to video encoder 200 (FIGS. 1 and 8), it should be understood that other devices may be configured to perform a process similar to that of FIG. 10.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 11:
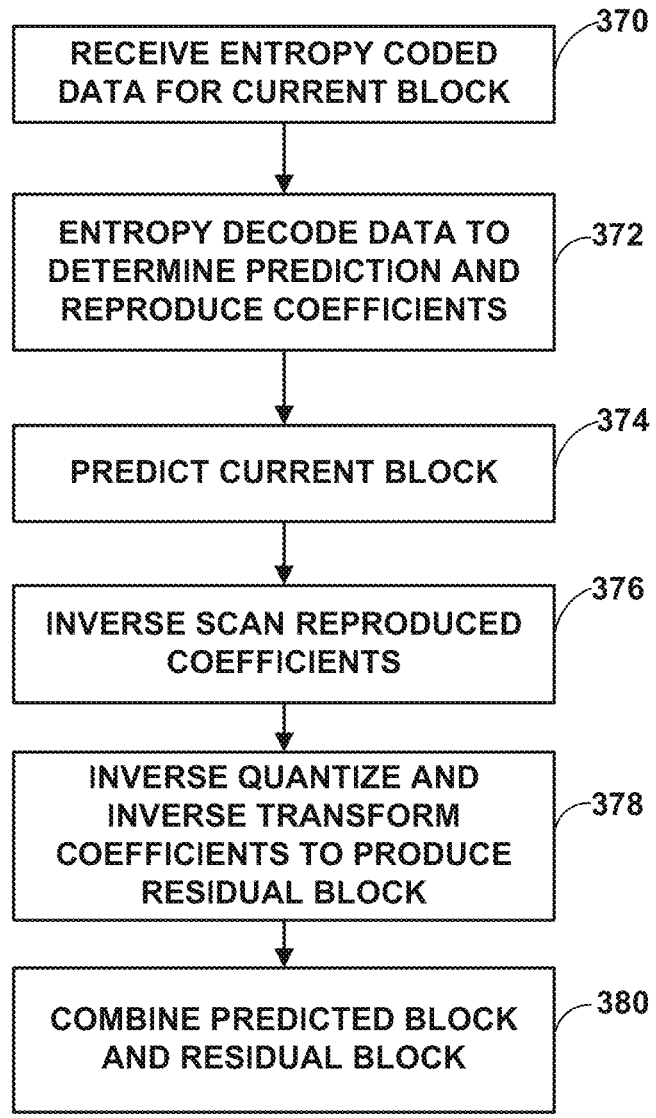
FIG. 11 is a flowchart illustrating an example process for decoding a current block of video data.

FIG. 11 is a flowchart illustrating an example process for decoding a current block of video data. The current block may include a current CU. Although described with respect to video decoder 300 (FIGS. 1 and 9), it should be understood that other devices may be configured to perform a process similar to that of FIG. 11.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 12:
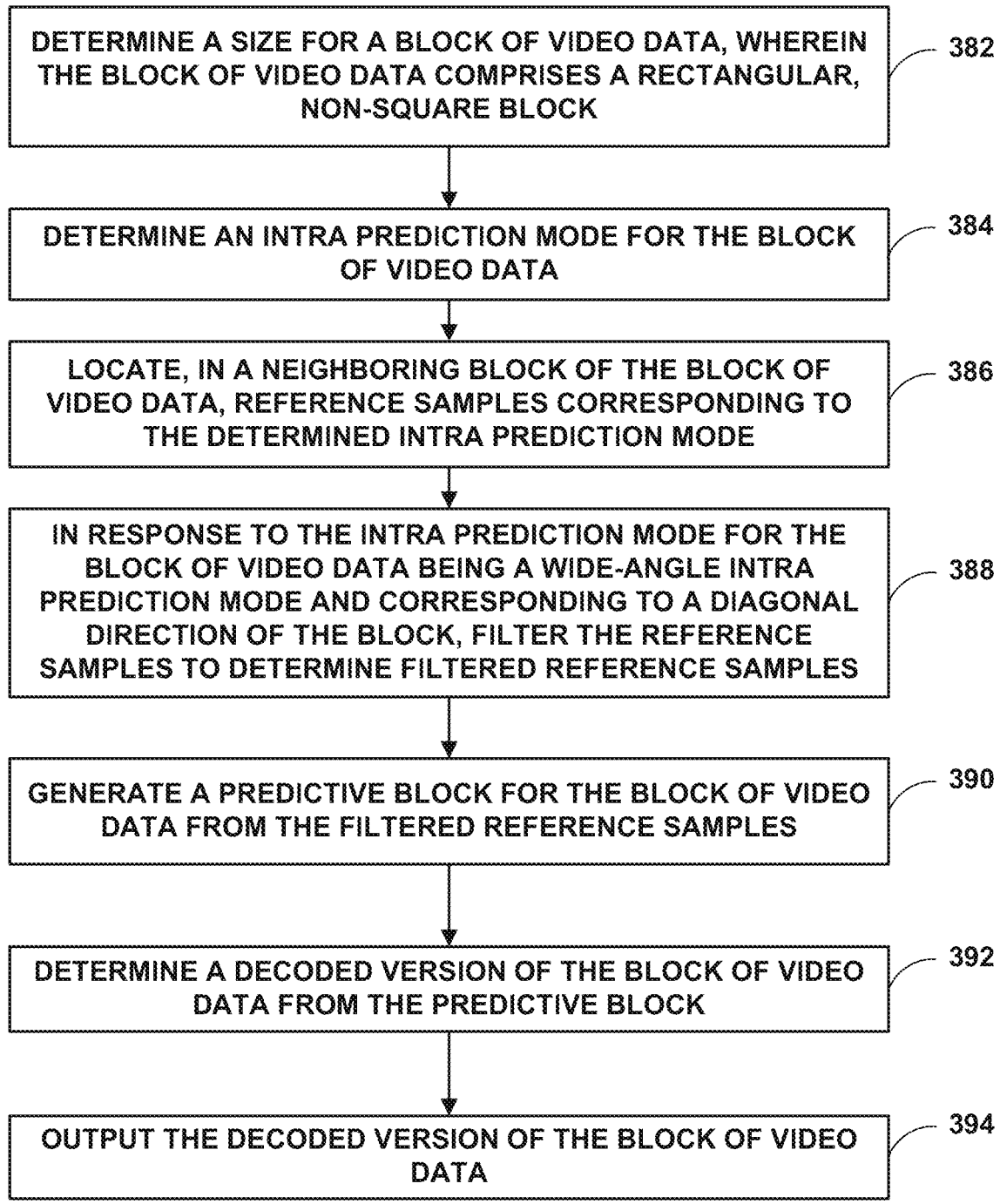
FIG. 12 is a flowchart illustrating an example process for decoding a current block of video data.

FIG. 12 is a flowchart illustrating an example process for decoding a current block of video data. The current block may include a current CU. Although described with respect to video decoder 300 (FIGS. 1 and 9), it should be understood that other devices may be configured to perform a process similar to that of FIG. 12. As one example, the process of FIG. 12 may also be performed by video encoder 200 as part of a process for determining how to encode a current block of video data.

In the example of FIG. 12, video decoder 300 determines a size for a block of video data, wherein the block of video data comprises a rectangular, non-square block (382). Video decoder 300 may, for example, determine the size for the block of video data by determining a size index based on a height of the block and a width of the block. Video decoder 300 may, for example, determine the size index based on the height of the block and the width of the block by determining the size index to be equal to (log 2(BlockWidth)+log 2(BlockHeight))/2, wherein BlockWidth is the width of the block and BlockHeight is the height of the block.

Video decoder 300 determines an intra prediction mode for the block of video data (384). Video decoder 300 locates, in a neighboring block of the block of video data, reference samples corresponding to the determined intra prediction mode (386). The reference samples may be non-fractional reference samples. The reference samples may be samples determined without interpolation filtering.

In response to the intra prediction mode for the block of video data being a wide-angle intra prediction mode and corresponding to a diagonal direction of the block, video decoder 300 filters the reference samples to determine filtered reference samples (388). The wide-angle intra prediction mode may be an intra prediction mode having a prediction angle between −135 degrees and −180 degrees or 45 degrees and 90 degrees.

The method of claim 1, wherein filtering the reference samples to determine filtered reference samples comprises applying a smoothing filter to the reference samples. The smoothing filter may, for example, be a 3-tap filter. In some examples, to apply the smoothing filter to the reference samples, video decoder 300 may apply the smoothing filtering before or without applying an interpolation filter to the reference samples. In other examples, to apply the smoothing filter to the reference samples, video decoder 300 may apply a smoothing interpolation filter to the reference samples.

Video decoder 300 generate a predictive block for the block of video data from the filtered reference samples (390). Video decoder 300 may generate the predictive block using intra prediction in the manner described above.

Video decoder 300 determines a decoded version of the block of video data from the predictive block (392). Video decoder 300 may, for instance, determine the decoded version of the block of video data by adding a residual block of video data to the predictive block.

In one example, video decoder 300 may determine a threshold value based on the size index; determine an intra mode difference value based on a difference between an intra mode index for the intra prediction mode and a horizontal index value and a difference between the intra mode index for the intra prediction mode and a vertical index value; and in response to the intra mode difference value being greater than the threshold value, filter the reference samples to determine the filtered reference samples. To determine an intra mode difference value, video decoder 300 may determine the intra mode difference value to be equal to min(abs (IntraModeIdx−HOR_IDX), abs(IntraModeIdx−VER_IDX)), wherein IntraModeIdx is the intra mode index for the intra prediction mode, HOR_IDX is the horizontal index value, and VER_IDX is the vertical index value. In one example, in response to determining that the size index is less than or equal to 2, video decoder 300 determines that the threshold value is equal to 16.

Video decoder 300 outputs the decoded version of the block of video data (394). Video decoder 300 may, for example, output the decoded version of the block of video as part of a picture for display or by storing, in a reference picture memory, the decoded version of the block of video data as part of a reference picture. When performed by a video encoder, the video encoder may output the decoded version of the block by storing, in a reference picture memory, the decoded version of the block of video data as part of a reference picture that can be used for encoding future pictures of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a first size for a first block of video data, wherein the first block of video data comprises a first rectangular, non-square block;
   determining a first intra prediction mode for the first block of video data;
   locating, in a first neighboring block of the first block of video data, first reference samples corresponding to the determined first intra prediction mode;
   in response to the first intra prediction mode for the first block of video data being a first wide-angle intra prediction mode and having an intra mode index that corresponds to a diagonal direction of the first block, filtering the first reference samples to determine filtered reference samples, wherein the first wide-angle intra prediction mode comprises a first intra prediction mode with a prediction angle of less than −135 degrees or greater than 45 degrees;
   generating a first predictive block for the first block of video data from the filtered reference samples;
   determining decoded version of the first block of video data from the first predictive block;
   determining a second size for a second block of video data, wherein the second block of video data comprises a second rectangular, non-square block;
   determining a second intra prediction mode for the second block of video data;
   locating, in a second neighboring block of the second block of video data, second reference samples corresponding to the determined second intra prediction mode;
   in response to the second intra prediction mode for the second block of video data being a second wide-angle intra prediction mode and having an intra mode index that corresponds to a non-diagonal direction of the second block, generating a second predictive block for the second block of video data from unfiltered reference samples of the neighboring block, wherein the first wide-angle intra prediction mode is different than the second wide-angle intra prediction mode and the second wide-angle intra prediction mode comprises a second intra prediction mode with a prediction angle of less than −135 degrees or greater than 45 degrees and;
   determining decoded version of the second block of video data from the second predictive block; and
   outputting the decoded version of the first block of video data and the decoded version of the second block of video data.

2. The method of claim 1, wherein the first reference samples comprise non-fractional reference samples.

3. The method of claim 1, wherein the first reference samples comprise samples determined without interpolation filtering.

4. The method of claim 1, wherein filtering the first reference samples to determine filtered reference samples comprises applying a smoothing filter to the first reference samples.

5. The method of claim 4, wherein the smoothing filter comprises a 3-tap filter.

6. The method of claim 4, wherein applying the smoothing filter to the first reference samples comprises applying the smoothing filtering before or without applying an interpolation filter to the first reference samples.

7. The method of claim 4, wherein applying the smoothing filter to the first reference samples comprises applying a smoothing interpolation filter to the first reference samples.

8. The method of claim 1, wherein determining the first size for the first block of video data comprises determining a size index based on a height of the first block and a width of the first block.

9. The method of claim 8, further comprising:
   determining a threshold value based on the size index;
   determining an intra mode difference value based on a difference between the intra mode index for the first intra prediction mode and a horizontal index value and a difference between the intra mode index for the first intra prediction mode and a vertical index value;
   in response to the intra mode difference value being greater than the threshold value, filtering the first reference samples to determine the filtered reference samples.

10. The method of claim 9, wherein determining the intra mode difference value comprises determining the intra mode difference value to be equal to:
   min(abs(IntraModeIdx−HOR_IDX), abs(IntraModeIdx−VER_IDX)), wherein IntraModeIdx is the intra mode index for the first intra prediction mode, HOR_IDX is the horizontal index value, and VER_IDX is the vertical index value.

11. The method of claim 9, the method further comprising:

in response to determining that the size index is less than or equal to 2, determining that the threshold value is equal to 16.

12. The method of claim 8, wherein determining the size index based on the height of the first block and the width of the first block comprises determining the size index to be equal to (log 2(BlockWidth)+log 2(BlockHeight))/2, wherein BlockWidth is the width of the first block and BlockHeight is the height of the first block.

13. The method of claim 1, wherein the method of decoding is performed as part of an encoding process and wherein outputting the decoded version of the first block of video data and the decoded version of the second block of video data comprises storing the decoded version of the first block of video data as part of a first reference picture and storing the decoded version of the second block of video data as part of a second reference picture.

14. A device for decoding video data, the device comprising:

a memory for storing video data; and
one or more processors configured to:
determine a first size for a first block of video data, wherein the first block of video data comprises a first rectangular, non-square block;
determine a first intra prediction mode for the first block of video data;
locate, in a first neighboring block of the first block of video data, first reference samples corresponding to the determined first intra prediction mode;
in response to the first intra prediction mode for the first block of video data being a first wide-angle intra prediction mode and having an intra mode index that corresponds to a diagonal direction of the first block, filter the first reference samples to determine filtered reference samples, wherein the first wide-angle intra prediction mode comprises a first intra prediction mode with a prediction angle of less than −135 degrees or greater than 45 degrees;
generate a first predictive block for the first block of video data from the filtered reference samples;
determine decoded version of the first block of video data from the first predictive block;
determine a second size for a second block of video data, wherein the second block of video data comprises a second rectangular, non-square block;
determine a second intra prediction mode for the second block of video data;
locate, in a second neighboring block of the second block of video data, second reference samples corresponding to the determined second intra prediction mode;
in response to the second intra prediction mode for the second block of video data being a second wide-angle intra prediction mode and having an intra mode index that corresponds to a non-diagonal direction of the second block, generate a second predictive block for the second block of video data from unfiltered reference samples of the neighboring block, wherein the first wide-angle intra prediction mode is different than the second wide-angle intra prediction mode and the second wide-angle intra prediction mode comprises a second intra prediction mode with a prediction angle of less than −135 degrees or greater than 45 degrees; and
determine decoded version of the second block of video data from the second predictive block; and
output the decoded version of the first block of video data and the decoded version of the second block of video data.

15. The device of claim 14, wherein the first reference samples comprise non-fractional reference samples.

16. The device of claim 14, wherein the first reference samples comprise samples determined without interpolation filtering.

17. The device of claim 14, wherein to filter the first reference samples to determine filtered reference samples, the one more processors are further configured to apply a smoothing filter to the first reference samples.

18. The device of claim 17, wherein the smoothing filter comprises a 3-tap filter.

19. The device of claim 17, wherein to apply the smoothing filter to the first reference samples, the one more processors are further configured to apply the smoothing filtering before or without applying an interpolation filter to the first reference samples.

20. The device of claim 17, wherein to apply the smoothing filter to the first reference samples, the one more processors are further configured to apply a smoothing interpolation filter to the first reference samples.

21. The device of claim 14, wherein to determine the first size for the first block of video data, the one more processors are further configured to determine a size index based on a height of the first block and a width of the first block.

22. The device of claim 21, wherein the one more processors are further configured to:

determine a threshold value based on the size index;
determine an intra mode difference value based on a difference between the intra mode index for the first intra prediction mode and a horizontal index value and a difference between the intra mode index for the first intra prediction mode and a vertical index value;
in response to the intra mode difference value being greater than the threshold value, filter the first reference samples to determine the filtered reference samples.

23. The device of claim 22, wherein to determine the intra mode difference value, the one more processors are further configured to determine the intra mode difference value to be equal to:

min(abs(IntraModeIdx−HOR_IDX), abs(IntraModeIdx−VER_IDX)), wherein IntraModeIdx is the intra mode index for the intra prediction mode, HOR_IDX is the horizontal index value, and VER_IDX is the vertical index value.

24. The device of claim 22, wherein the one more processors are further configured to:

in response to determining that the size index is less than or equal to 2, determine that the threshold value is equal to 16.

25. The device of claim 21, wherein to determine the size index based on the height of the first block and the width of the first block, the one more processors are further configured to determine the size index to be equal to (log 2(BlockWidth)+log 2(BlockHeight))/2, wherein BlockWidth is the width of the first block and BlockHeight is the height of the first block.

26. The device of claim 14, wherein the one or more processors are configured to decode the video data as part of an encoding process and wherein to output the decoded version of the first block of video data and the decoded version of the second block of video data, the one or more processors are further configured to store the decoded version of the first block of video data as part of a first reference picture and storing the decoded version of the second block of video data as part of a second reference picture.

27. A non-transitory computer-readable storage medium storing instructions that when executed by one or more processors cause the one or more processor to:
  determine a first size for a first block of video data, wherein the first block of video data comprises a first rectangular, non-square block;
  determine a first intra prediction mode for the first block of video data;
  locate, in a first neighboring block of the first block of video data, first reference samples corresponding to the determined first intra prediction mode;
  in response to the first intra prediction mode for the first block of video data being a first wide-angle intra prediction mode and having an intra mode index that corresponds to a diagonal direction of the first block, filter the first reference samples to determine filtered reference samples, wherein the first wide-angle intra prediction mode comprises a first intra prediction mode with a prediction angle of less than −135 degrees or greater than 45 degrees;
  generate a first predictive block for the first block of video data from the filtered reference samples;
  determine decoded version of the first block of video data from the first predictive block;
  determine a second size for a second block of video data, wherein the second block of video data comprises a second rectangular, non-square block;
  determine a second intra prediction mode for the second block of video data;
  locate, in a second neighboring block of the second block of video data, second reference samples corresponding to the determined second intra prediction mode;
  in response to the second intra prediction mode for the second block of video data being a second wide-angle intra prediction mode and having an intra mode index that corresponds to a non-diagonal direction of the second block, generate a second predictive block for the second block of video data from unfiltered reference samples of the neighboring block, wherein the first wide-angle intra prediction mode is different than the second wide-angle intra prediction mode and the second wide-angle intra prediction mode comprises a second intra prediction mode with a prediction angle of less than −135 degrees or greater than 45 degrees and;
  determine decoded version of the second block of video data from the second predictive block; and
  output the decoded version of the first block of video data and the decoded version of the second block of video data.

28. The non-transitory computer-readable storage medium of claim 27, wherein the first reference samples comprise non-fractional reference samples.

29. The non-transitory computer-readable storage medium of claim 27, wherein the first reference samples comprise samples determined without interpolation filtering.

30. The non-transitory computer-readable storage medium of claim 27, wherein to filter the first reference samples to determine filtered reference samples, the instructions cause the one more processors to apply a smoothing filter to the first reference samples.

31. The non-transitory computer-readable storage medium of claim 30, wherein the smoothing filter comprises a 3-tap filter.

32. The non-transitory computer-readable storage medium of claim 30, wherein to apply the smoothing filter to the first reference samples, the instructions cause the one more processors to apply the smoothing filtering before or without applying an interpolation filter to the first reference samples.

33. The non-transitory computer-readable storage medium of claim 30, wherein to apply the smoothing filter to the first reference samples, the instructions cause the one more processors to apply a smoothing interpolation filter to the first reference samples.

34. The non-transitory computer-readable storage medium of claim 27, wherein to determine the size for the first block of video data, the instructions cause the one more processors to determine a size index based on a height of the first block and a width of the first block.

35. The non-transitory computer-readable storage medium of claim 34, storing further instructions that when executed cause the one more processors to:
  determine a threshold value based on the size index;
  determine an intra mode difference value based on a difference between the intra mode index for the first intra prediction mode and a horizontal index value and a difference between the intra mode index for the first intra prediction mode and a vertical index value;
  in response to the intra mode difference value being greater than the threshold value, filter the first reference samples to determine the filtered reference samples.

36. The non-transitory computer-readable storage medium of claim 35, wherein to determine the intra mode difference value, the instructions cause the one more processors to determine the intra mode difference value to be equal to:
  min(abs(IntraModeIdx−HOR_IDX), abs(IntraModeIdx−VER_IDX)), wherein IntraModeIdx is the intra mode index for the first intra prediction mode, HOR_IDX is the horizontal index value, and VER_IDX is the vertical index value.

37. The non-transitory computer-readable storage medium of claim 35, storing further instructions that when executed cause the one or more processors to:
  in response to determining that the size index is less than or equal to 2, determine that the threshold value is equal to 16.

38. The non-transitory computer-readable storage medium of claim 34, wherein to determine the size index based on the height of the first block and the width of the first block, the instructions cause the one more processors to determine the size index to be equal to (log 2(BlockWidth)+log 2(BlockHeight))/2, wherein BlockWidth is the width of the first block and BlockHeight is the height of the first block.

39. The non-transitory computer-readable storage medium of claim 27, wherein the instructions cause the one or more processors to decode the video data as part of an encoding process and wherein to output the decoded version of the first block of video data and the decoded version of the second block of video data, the one more processors are further configured to store the decoded version of the first block of video data as part of a data and the decoded version of the second block of video data reference picture and store the decoded version of the second block of video data as part of a second reference picture.

40. An apparatus for decoding video data, the apparatus comprising:
  means for determining a first size for a first block of video data, wherein the first block of video data comprises a first rectangular, non-square block;

means for determining a first intra prediction mode for the first block of video data;

means for locating, in a first neighboring block of the first block of video data, first reference samples corresponding to the determined first intra prediction mode;

means for filtering the first reference samples to determine filtered reference samples in response to the first intra prediction mode for the first block of video data being a first wide-angle intra prediction mode and having an intra mode index that corresponds to a diagonal direction of the first block, wherein the first wide-angle intra prediction mode comprises a first intra prediction mode with a prediction angle of less than −135 degrees or greater than 45 degrees;

means for generating a first predictive block for the first block of video data from the filtered reference samples;

means for determining decoded version of the first block of video data from the first predictive block;

means for determining a second size for a second block of video data, wherein the second block of video data comprises a second rectangular, non-square block;

means for determining a second intra prediction mode for the second block of video data;

means for locating, in a second neighboring block of the second block of video data, second reference samples corresponding to the determined second intra prediction mode;

means for generating a second predictive block for the second block of video data from unfiltered reference samples of the neighboring block in response to the second intra prediction mode for the second block of video data being a second wide-angle intra prediction mode and having an intra mode index that corresponds to a non-diagonal direction of the second block, wherein the first wide-angle intra prediction mode is different than the second wide-angle intra prediction mode and the second wide-angle intra prediction mode comprises a second intra prediction mode with a prediction angle of less than −135 degrees or greater than 45 degrees and;

means for determining decoded version of the second block of video data from the second predictive block; and means for outputting the decoded version of the first block of video data and the decoded version of the second block of video data.

41. The method of claim 1, wherein the first intra prediction mode has a prediction angle of greater than −180 degrees and less than −135 degrees or a prediction angle of greater than 45 degrees an less than 90 degrees and the second intra prediction mode has a prediction angle of greater than −180 degrees and less than −135 degrees or a prediction angle of greater than 45 degrees an less than 90 degrees.

42. The device of claim 14, wherein the first intra prediction mode has a prediction angle of greater than −180 degrees and less than −135 degrees or a prediction angle of greater than 45 degrees an less than 90 degrees and the second intra prediction mode has a prediction angle of greater than −180 degrees and less than −135 degrees or a prediction angle of greater than 45 degrees an less than 90 degrees.

* * * * *